(12) United States Patent
El-Alfy et al.

(10) Patent No.: US 11,227,195 B2
(45) Date of Patent: Jan. 18, 2022

(54) MULTI-MODAL DETECTION ENGINE OF SENTIMENT AND DEMOGRAPHIC CHARACTERISTICS FOR SOCIAL MEDIA VIDEOS

(71) Applicant: King Fahd University of Petroleum and Minerals, Dhahran (SA)

(72) Inventors: El-Sayed M. El-Alfy, Dhahran (SA); Sadam Hussein Al-Azani, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 274 days.

(21) Appl. No.: 16/590,856

(22) Filed: Oct. 2, 2019

(65) Prior Publication Data
US 2021/0103762 A1    Apr. 8, 2021

(51) Int. Cl.
*G06K 9/62*    (2006.01)
*G06K 9/00*    (2006.01)
(Continued)

(52) U.S. Cl.
CPC ......... *G06K 9/629* (2013.01); *G06K 9/00228* (2013.01); *G06K 9/00275* (2013.01);
(Continued)

(58) Field of Classification Search
CPC .............. G06K 9/629; G06K 9/00228; G06K 9/00275; G06K 9/00281; G06K 9/00744; G06K 9/42; G06K 9/6269; G06K 9/628; G06K 2209/013; G06K 2009/00322; G06T 7/269; G06T 2207/10016;
(Continued)

(56) References Cited

U.S. PATENT DOCUMENTS 7,227,893 B1    6/2007  Srinivasa et al.
8,924,993 B1    12/2014 Niebles Duque et al.
(Continued)

OTHER PUBLICATIONS

Al-Azani, et al. ; Multimodal Sentiment and Gender Classification for Video Logs ; Science and Technology Publications ; 8 Pages.
(Continued)

*Primary Examiner* — Qun Shen
(74) *Attorney, Agent, or Firm* — Oblon, McClelland, Maier & Neustadt, L.L.P.

(57) ABSTRACT

A system and method for determining a sentiment, a gender and an age group of a subject in a video while the video is being played back. The video is separated into visual data and audio data, the video data is passed to a video processing pipeline and the audio data is passed to both an acoustic processing pipeline and a textual processing pipeline. The system and method performs, in parallel, a video feature extraction process in the video processing pipeline, an acoustic feature extraction process in the acoustic processing pipeline, and a textual feature extraction process in the textual processing pipeline. The system and method combines a resulting visual feature vector, acoustic feature vector, and a textual feature vector into a single feature vector, and determines the sentiment, the gender and the age group of the subject by applying the single feature vector to a machine learning model.

18 Claims, 17 Drawing Sheets

(51) Int. Cl.
*G10L 25/18* (2013.01)
*G10L 25/63* (2013.01)
*G06K 9/42* (2006.01)
*G06T 7/269* (2017.01)
*G10L 15/02* (2006.01)
*G10L 25/57* (2013.01)

(52) U.S. Cl.
CPC ..... *G06K 9/00281* (2013.01); *G06K 9/00744* (2013.01); *G06K 9/42* (2013.01); *G06K 9/628* (2013.01); *G06K 9/6269* (2013.01); *G06T 7/269* (2017.01); *G10L 15/02* (2013.01); *G10L 25/18* (2013.01); *G10L 25/57* (2013.01); *G10L 25/63* (2013.01); *G06K 2009/00322* (2013.01); *G06K 2209/013* (2013.01); *G06T 2207/10016* (2013.01); *G06T 2207/20072* (2013.01); *G06T 2207/20081* (2013.01); *G06T 2207/20084* (2013.01); *G06T 2207/30201* (2013.01)

(58) Field of Classification Search
CPC . G06T 2207/20072; G06T 2207/20081; G06T 2207/20084; G06T 2207/30201; G10L 15/02; G10L 25/18; G10L 25/57; G10L 25/63
See application file for complete search history.

(56) References Cited

U.S. PATENT DOCUMENTS

| | | | | |
|---|---|---|---|---|
| 2006/0293880 | A1* | 12/2006 | Elshishiny | G06F 16/374 704/10 |
| 2010/0191689 | A1* | 7/2010 | Cortes | G06F 16/783 706/46 |
| 2014/0278749 | A1 | 9/2014 | Trenkle et al. | |
| 2016/0132788 | A1* | 5/2016 | Li | G06Q 50/01 706/12 |
| 2016/0328384 | A1 | 11/2016 | Divakaran et al. | |
| 2017/0048069 | A1* | 2/2017 | Baessler | G06F 16/81 |
| 2018/0174020 | A1* | 6/2018 | Wu | G06N 3/08 |
| 2018/0268298 | A1 | 9/2018 | Johansen et al. | |
| 2019/0073547 | A1* | 3/2019 | el Kaliouby | G06K 9/00302 |
| 2019/0295124 | A1* | 9/2019 | Ramesh | G06N 3/08 |
| 2020/0250837 | A1* | 8/2020 | Fagg | G06K 9/00791 |
| 2020/0257934 | A1* | 8/2020 | Bastiman | G06F 16/583 |
| 2020/0357382 | A1* | 11/2020 | Ogawa | G10L 13/0335 |

OTHER PUBLICATIONS

Viola, et al. ; Robust Real-Time Face Detection ; International Journal of Computer Vision 57 (2) ; pp. 137-154 ; 2004 ;18 Pages.

Mikolov, et al. ; Efficient Estimation of Word Representations in Vector Space ; Sep. 7, 2013 ; 12 Pages.

Soleymani, et al. ; A survey of multimodal sentiment analysis ; Image and Vision Computing ; Aug. 22, 2017 ; 12 Pages.

Rublee, et al. ; ORB: an efficient alternative to SIFT or SURF ; 8 Pages.

Giannakopoulos ; pyAudioAnalysis: An Open-Source Python Library for Audio Signal Analysis ; PLoS One 10(12) ; Dec. 11, 2015; 18 Pages.

Saif, et al. ; Sentiment Analysis in Social Streams ; 22 Pages.

Al-Azani, et al. ; Multimodal Age-Group Recognition for Opinion Video Logs using Ensemble of Neural Networks ; International Journal of Advanced Computer Science and Applications, vol. 10, No. 4 ; 2019 ; 8 Pages.

Al-Azani, et al. ; Using Feature-Level Fusion for Multimodal Gender Recognition for Opinion Mining Videos ; 6 Pages.

* cited by examiner

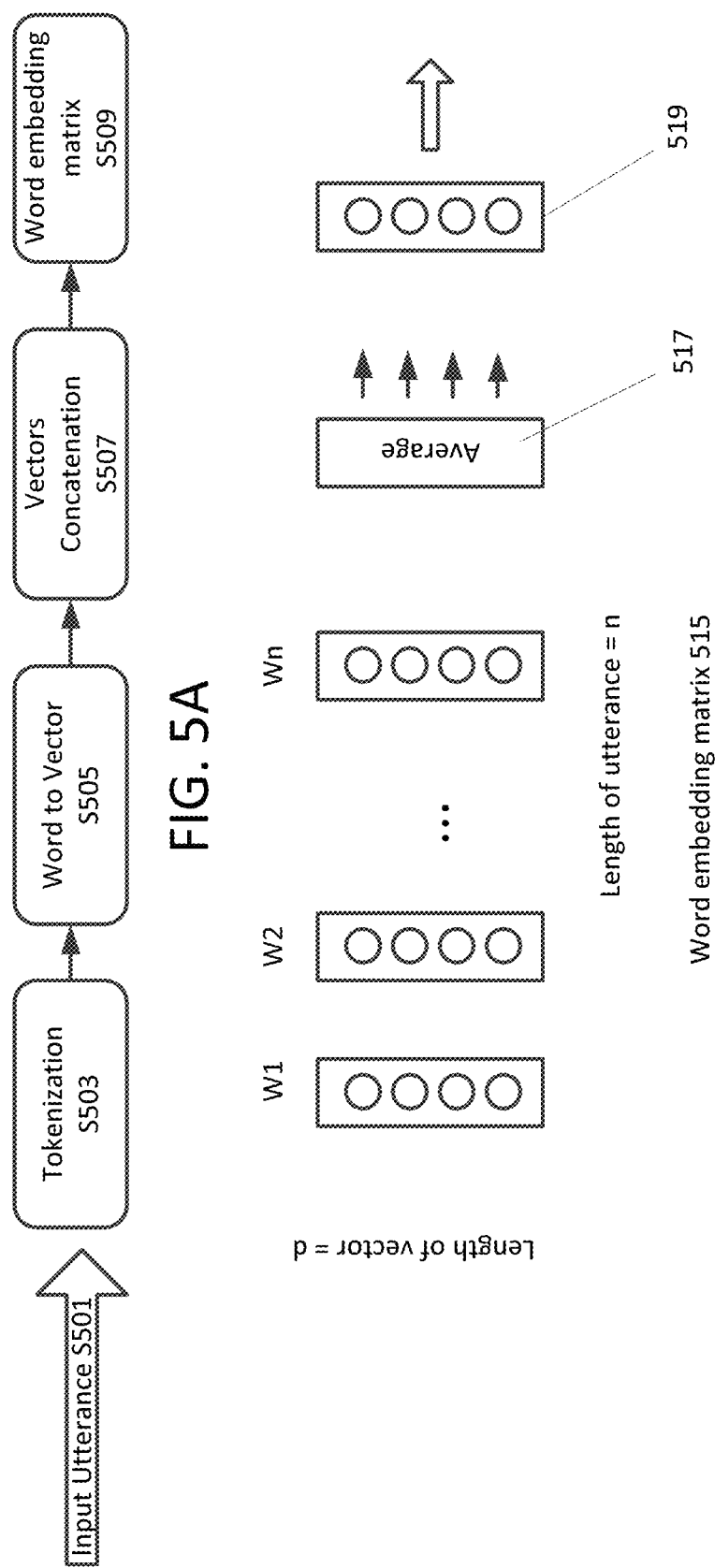

|  | Actual | | |
|---|---|---|---|
| Predicted | N | P | Total |
| N | 232 | 17 | 249 |
| P | 18 | 257 | 275 |
| Total | 250 | 274 | 524 |

FIG. 11A

|  | Actual | | |
|---|---|---|---|
| Predicted | F | M | Total |
| F | 206 | 9 | 215 |
| M | 10 | 299 | 309 |
| Total | 216 | 308 | 524 |

FIG. 11B

|  | Actual | | | | |
|---|---|---|---|---|---|
| Predicted | A | B | C | D | Total |
| A | 111 | 4 | 6 | 3 | 124 |
| B | 6 | 141 | 10 | 2 | 159 |
| C | 9 | 9 | 118 | 8 | 144 |
| D | 2 | 5 | 8 | 82 | 97 |
| Total | 128 | 159 | 142 | 95 | 524 |

FIG. 11C

|          | Actual |      |     |     |     |       |
|----------|--------|------|-----|-----|-----|-------|
|          |        | N_F  | N_M | P_F | P_M | Total |
| Predicted| N_F    | 70   | 2   | 6   |     | 78    |
|          | N_M    | 5    | 155 |     | 11  | 171   |
|          | P_F    | 7    | 1   | 123 | 6   | 137   |
|          | P_M    |      | 10  | 5   | 123 | 138   |
|          | Total  | 80   | 168 | 134 | 140 | 524   |

FIG. 12A

|          | Actual |     |     |     |     |     |     |     |     |       |
|----------|--------|-----|-----|-----|-----|-----|-----|-----|-----|-------|
|          |        | N_A | N_B | N_C | N_D | P_A | P_B | P_C | P_D | Total |
| Predicted| N_A    | 19  | 1   | 2   | 2   | 3   |     |     |     | 27    |
|          | N_B    |     | 41  | 7   | 2   | 1   | 4   |     |     | 55    |
|          | N_C    | 1   | 1   | 72  | 7   | 1   | 2   | 2   |     | 86    |
|          | N_D    |     | 1   | 7   | 69  |     | 1   |     | 3   | 81    |
|          | P_A    | 5   |     |     | 1   | 84  | 3   | 4   |     | 97    |
|          | P_B    |     | 2   | 0   |     | 5   | 94  | 3   |     | 104   |
|          | P_C    |     |     | 7   |     | 7   | 6   | 37  | 1   | 58    |
|          | P_D    |     |     |     | 3   | 2   | 3   | 1   | 7   | 16    |
|          | Total  | 25  | 46  | 95  | 84  | 103 | 113 | 47  | 11  | 524   |

FIG. 12B

|          | Actual |     |     |     |     |     |     |     |     |       |
|----------|--------|-----|-----|-----|-----|-----|-----|-----|-----|-------|
|          |        | F_A | F_B | F_C | F_D | M_A | M_B | M_C | M_D | Total |
| Predicted| F_A    | 50  | 1   | 3   | 2   |     |     |     |     | 56    |
|          | F_B    | 4   | 53  | 5   |     |     | 3   |     |     | 65    |
|          | F_C    | 6   | 3   | 60  | 3   |     | 1   | 3   | 1   | 77    |
|          | F_D    |     | 2   | 3   | 11  |     |     |     | 1   | 17    |
|          | M_A    | 2   |     |     |     | 59  | 3   | 3   | 1   | 68    |
|          | M_B    |     | 1   |     |     | 2   | 84  | 5   | 2   | 94    |
|          | M_C    |     |     | 2   | 1   | 3   | 5   | 53  | 3   | 67    |
|          | M_D    |     |     | 1   | 3   | 2   | 3   | 4   | 67  | 80    |
|          | Total  | 62  | 60  | 74  | 20  | 66  | 99  | 68  | 75  | 524   |

Confusion matrix (Predicted vs Actual):

| Predicted \ Actual | N_F_A | N_F_B | N_F_C | N_F_D | N_M_A | N_M_B | N_M_C | N_M_D | P_F_A | P_F_B | P_F_C | P_F_D | P_M_A | P_M_B | P_M_C | P_M_D | Total |
|---|---|---|---|---|---|---|---|---|---|---|---|---|---|---|---|---|---|
| N_F_A | | 1 | 1 | | | | | | 1 | | | | 1 | | | | 4 |
| N_F_B | 19 | 2 | | | | | | | | 1 | | | | | | | 23 |
| N_F_C | | 32 | 2 | | | | | | | 1 | | | | | | | 38 |
| N_F_D | 1 | 3 | 8 | 1 | | | | | | | | | | | | | 13 |
| N_M_A | | | | | 19 | | | | | | | | | | | | 23 |
| N_M_B | 1 | | | | | 21 | 5 | 2 | | 1 | | | 3 | | | | 32 |
| N_M_C | | 1 | 1 | | 1 | 1 | 38 | 3 | | 1 | | | 1 | 1 | 1 | | 48 |
| N_M_D | | 1 | 1 | | | | 3 | 60 | | | | | 1 | 1 | | 2 | 68 |
| P_F_A | | | | | | | | | 49 | | 2 | | | | | | 52 |
| P_F_B | 2 | | | | | | | | 3 | 31 | 3 | | | 3 | | | 42 |
| P_F_C | | 3 | | | | | 1 | | 6 | 2 | 24 | 1 | 1 | 1 | 1 | | 39 |
| P_F_D | | | | | | | | | | | | 1 | | | | | 4 |
| P_M_A | | | | | 5 | | 3 | | 2 | | 1 | | 33 | 3 | 2 | | 45 |
| P_M_B | | | | | | | | | | | | | 2 | 60 | | | 62 |
| P_M_C | | | | | | | | | | | | | 1 | 3 | 11 | 1 | 19 |
| P_M_D | | | | | | | | 2 | | | | 2 | 2 | 2 | 1 | 3 | 12 |
| Total | 0 | 24 | 43 | 15 | 25 | 22 | 52 | 69 | 62 | 36 | 31 | 5 | 41 | 77 | 16 | 6 | 524 |

| Category | Rec | Prc | F1 |
| --- | --- | --- | --- |
| N | 0.9280 | 0.9317 | 0.9299 |
| P | 0.9380 | 0.9345 | 0.9362 |
| F | 0.9537 | 0.9581 | 0.9559 |
| M | 0.9708 | 0.9676 | 0.9692 |
| A | 0.8672 | 0.8952 | 0.8810 |
| B | 0.8868 | 0.8868 | 0.8868 |
| C | 0.8310 | 0.8194 | 0.8252 |
| D | 0.8632 | 0.8454 | 0.8542 |

FIG. 14A

| Category | Rec | Prc | F1 |
| --- | --- | --- | --- |
| N_F | 0.8537 | 0.8974 | 0.8750 |
| N_M | 0.9226 | 0.9064 | 0.9145 |
| P_F | 0.9179 | 0.8978 | 0.9077 |
| P_M | 0.8786 | 0.8913 | 0.8849 |
| N_A | 0.7600 | 0.7037 | 0.7308 |
| N_B | 0.8913 | 0.7455 | 0.8119 |
| N_C | 0.7579 | 0.8372 | 0.7956 |
| N_D | 0.8214 | 0.8519 | 0.8364 |
| P_A | 0.8155 | 0.8660 | 0.8400 |
| P_B | 0.8319 | 0.9038 | 0.8664 |
| P_C | 0.7872 | 0.6379 | 0.7048 |
| P_D | 0.6364 | 0.4375 | 0.5185 |
| F_A | 0.8065 | 0.8929 | 0.8475 |
| F_B | 0.8833 | 0.8154 | 0.8480 |
| F_C | 0.8108 | 0.7792 | 0.7947 |
| F_D | 0.5500 | 0.6471 | 0.5946 |
| M_A | 0.8939 | 0.8676 | 0.8806 |
| M_B | 0.8485 | 0.8936 | 0.8705 |
| M_C | 0.7794 | 0.7910 | 0.7852 |
| M_D | 0.8933 | 0.8375 | 0.8645 |

FIG. 14B

| Category | Rec | Prc | F1 |
|---|---|---|---|
| N_F_A | 1.0000 | 0.0000 | 0.0000 |
| N_F_B | 0.7917 | 0.8261 | 0.8085 |
| N_F_C | 0.7442 | 0.8421 | 0.7901 |
| N_F_D | 0.5333 | 0.6154 | 0.5714 |
| N_M_A | 0.7600 | 0.8261 | 0.7917 |
| N_M_B | 0.9545 | 0.6563 | 0.7778 |
| N_M_C | 0.7308 | 0.7917 | 0.7600 |
| N_M_D | 0.8696 | 0.8824 | 0.8759 |
| P_F_A | 0.7903 | 0.9423 | 0.8596 |
| P_F_B | 0.8611 | 0.7381 | 0.7949 |
| P_F_C | 0.7742 | 0.6154 | 0.6857 |
| P_F_D | 0.2000 | 0.2500 | 0.2222 |
| P_M_A | 0.8049 | 0.7333 | 0.7674 |
| P_M_B | 0.7792 | 0.9677 | 0.8633 |
| P_M_C | 0.6875 | 0.5789 | 0.6286 |
| P_M_D | 0.5000 | 0.2500 | 0.3333 |

FIG. 14C

| Category | Rec | Prc | F1 | Acc |
|---|---|---|---|---|
| Sentiment | 0.9330 | 0.9331 | 0.9331 | 0.9332 |
| Gender | 0.9622 | 0.9629 | 0.9626 | 0.9637 |
| Age | 0.8620 | 0.8617 | 0.8618 | 0.8626 |
| Sentiment_Gender | 0.8932 | 0.8982 | 0.8955 | 0.8989 |
| Sentiment_Age | 0.7877 | 0.7479 | 0.7630 | 0.8073 |
| Gender_Age | 0.8082 | 0.8155 | 0.8107 | 0.8340 |
| Sentiment_Gender_Age | 0.7363 | 0.6572 | 0.6582 | 0.7805 |

FIG. 15

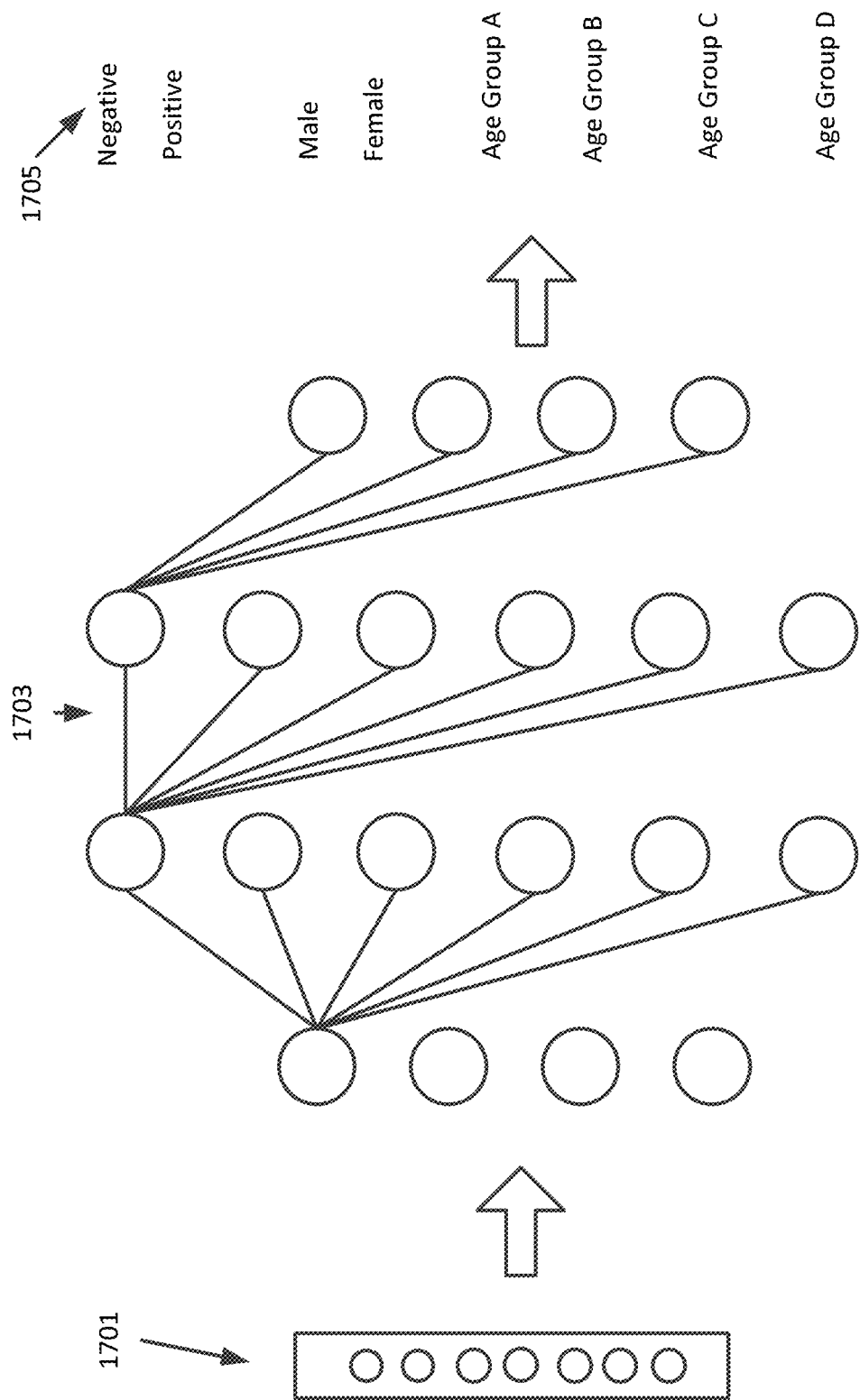

MULTI-MODAL DETECTION ENGINE OF SENTIMENT AND DEMOGRAPHIC CHARACTERISTICS FOR SOCIAL MEDIA VIDEOS

BACKGROUND

Technical Field

The present disclosure is directed to a multi-modal system for sentiment and demographic detection using visual, audio and textual features extracted from videos shared in social media.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Social media platforms have become a very attractive environment for people to share and express their opinions on various issues using different forms of content including texts, audios, images and videos. For years, work on sentiment analysis and opinion mining has mainly focused on people reviews expressed in textual form. See Liu, B.: Sentiment analysis and opinion mining. Synthesis Lectures on Human Language Technologies 5(1), 1-167 (2012), incorporated herein by reference in its entirety. However, text has many limitations and can be ambiguous. Recently there is a growing interest in video opinion mining. See Soleymani, M., Garcia, D., Jou, B., Schuller, B., Chang, S. F., Pantic, M.: A survey of multimodal sentiment analysis. Image and Vision Computing 65,3-14 (2017), incorporated herein by reference in its entirety.

Video has several modalities, including visual and audio, that complement each other to provide better insight into sentiment and opinion, and to provide a more accurate analysis to help decision makers. However, the problem of video opinion mining is challenging especially when combined with other goals such as demographic segmentation. The aim of sentiment analysis is not only to detect the sentiment polarity of the subject but also to relate her/his opinion to other characteristics such as gender and age. Information of this relationship can provide remarkable benefits in many sectors such as business, politics, education, governmental services, and healthcare. Therefore, there is a need to develop means and techniques to automatically analyze videos and understand them.

Demographic characteristics such as gender and age have recently received huge attention due to the arising need for personalized, reliable, and secure systems. Many studies and several methodologies have been proposed to address each characteristic individually using a single modality, e.g. audio or facial attributes. These studies focus on better understanding the single modality for gender or age. These studies do not detect opinion polarity and simultaneously identify gender and age.

Accordingly, it is one object of the present disclosure to provide a method, system and computer program product for automated sentiment and opinion analysis based at least in part on video data/images of a subject.

SUMMARY

In an exemplary embodiment, a system, method and computer program product determines a sentiment, a gender and an age group of a subject in a video. The method is performed by a computer system having circuitry. The system and method are performed as a background process, that includes while the video is being played back, separating the video into visual data and audio data; passing the video data to a video processing pipeline and passing the audio data to both an acoustic processing pipeline and a textual processing pipeline; performing, in parallel, a video feature extraction process in the video processing pipeline to obtain a visual feature vector, an acoustic feature extraction process in the acoustic processing pipeline to obtain an acoustic feature vector, and a textual feature extraction process in the textual processing pipeline to obtain a textual feature vector; combining the visual feature vector, acoustic feature vector, and textual feature vector into a single feature vector; determining the sentiment, the gender and the age group of the subject by applying the single feature vector to a machine learning model; and outputting the sentiment, the gender and the age group of the subject.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5A, 5B illustrate the textual feature extraction process;

FIGS. 11A-11C illustrate the system performance in terms of confusion matrix w.r.t. (a) Sentiment only, (b) Gender only, and (c) Age only;

FIGS. 12A-12C illustrate the system performance in terms of confusion matrix w.r.t. pairs of labels: (a) Sentiment Gender, (b) Sentiment Age, and (c) Gender Age;

FIG. 13 illustrates the system performance in terms of confusion matrix w.r.t. Tri-labels (Sentiment Gender Age);

FIGS. 14A-14C illustrate the per class performance in terms of precision, recall and $F_1$ measure w.r.t.: (a) Single label, (b) Pair of labels, and (c) Tri-labels;

FIG. 15 illustrates the accuracy and average precision, recall and $F_1$ measure for Sentiment, Gender, Age, Sentiment Gender, Sentiment Age, Gender Age, and Sentiment Gender Age;

FIG. 17 is a block diagram of a neural network implementation in accordance with an exemplary aspect of the disclosure.

DETAILED DESCRIPTION

Figure 1:
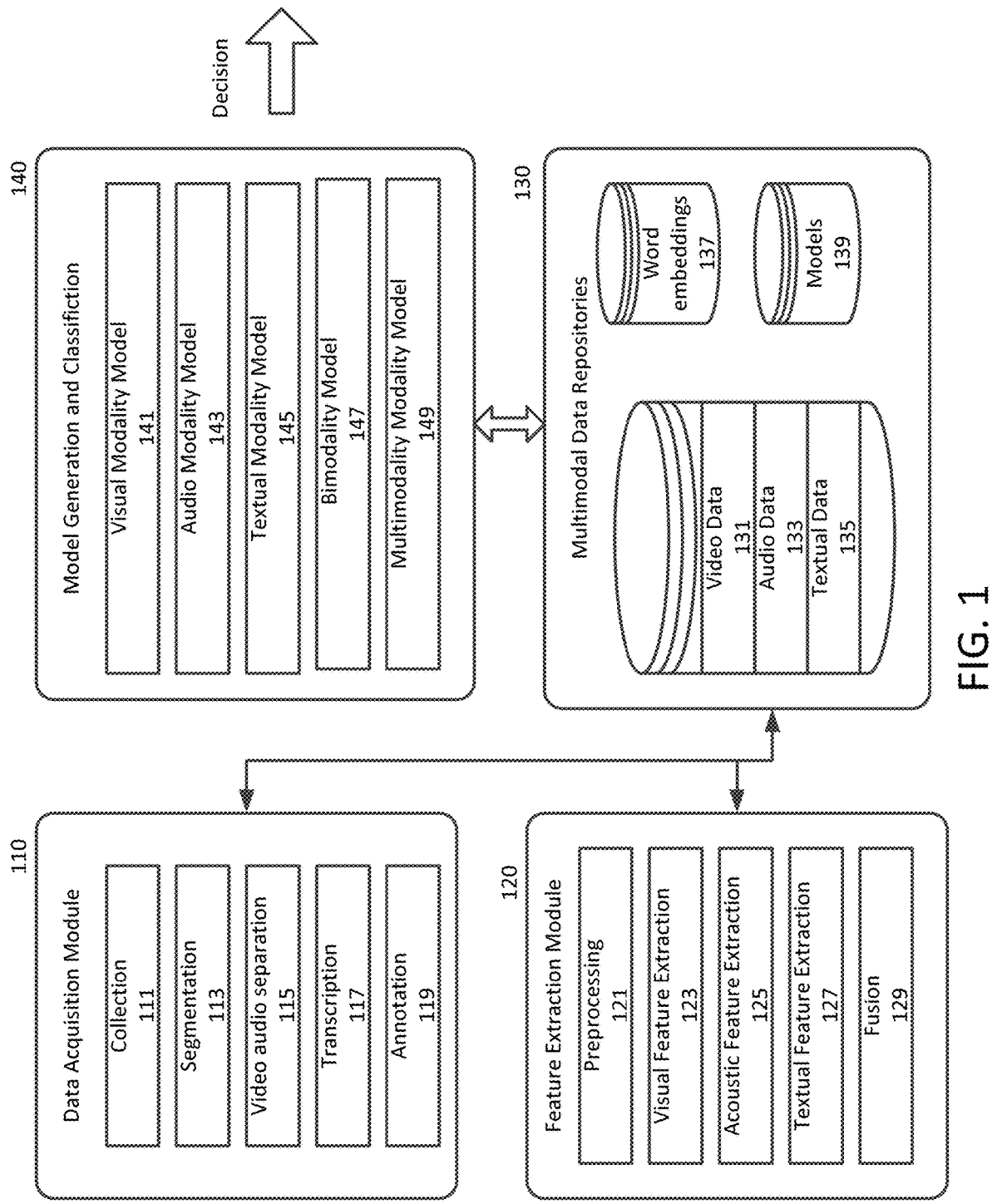
FIG. 1 illustrates the general block diagram of a multimodal framework.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Disclosed is a method and a system to detect sentiment, gender and age group of a subject person in a video. The system is capable of detecting the subjects' sentiment in various combinations with their gender and age group by extracting multiple modalities from the video for a subject person. The system may evaluate different features of the multiple modalities. For example, the system may evaluate word embeddings to detect gender and age of persons. In addition, the system may apply a combination of prosodic and spectral features to detect sentiment, gender and age of a person. The system may determine visual features based on a combination of local and global descriptors.

The disclosed multi-modal system is found to be more accurate than unimodal systems. The system uses facial features in combination with auditory features and textual features to characterize sentiment and opinion and has been found to be more robust and can work even with noisy data and various combinations of modalities. The system has been found to produce accurate results even with noisy data that includes a large amount of meaningless data. The system has been found to produce accurate results for combinations of modalities such as sentiment only, gender only, age group only, sentiment and gender, sentiment and age group, gender and age group, and a combination of all three modalities of sentiment, gender and ager group Current sentiment recognition systems analyze a user's opinion and ignore gender and age. In contrast, the disclosed approach considers gender and age of a person in a video.

Conventional unimodal sentiment analysis systems are domain-, topic- and time-dependent. In contrast, the disclosed approach is multi-modal and thus provides substantially improved accuracy in comparison with conventional sentiment analysis systems.

Furthermore, the disclosed system may recognize and report sentiment and demographic characteristics while a video is being played. This aspect may be applied in several and different application domains and areas. The disclosed system may be integrated with web browsers or as a standalone application that accesses social media platforms using computer networks and smartphones. While videos are played the system can recognize and report sentiment and demographic characteristics of persons. This feature may be useful in demographic studies concerning marketing customized products and services, public opinion research on political polls and governmental services, intelligent tutoring systems, etc.

Moreover, detecting or predicting a person's opinion together with gender and age group is very important and has several interesting applications. For example, it is an excellent opportunity for large companies to capitalize on, by extracting a person's sentiment, suggestions, and complaints on their products from video reviews. Consequently, companies can improve and enhance their products/services to meet the needs of customers. This information is more accurate, efficient and effective when it takes into consideration the gender and age groups of the subjects. For example, product reviews of facial shaving machines by males are more valuable to a company marketing facial shaving devices in comparison to reviews from females. Likewise, reviews of women-specific products such as cosmetics are more valuable when obtained from females than from males for a marketing program targeting a female audience. In addition, some products are specific for young people such as headphones and make-up. Reviews of such products by elderly people may be biased and results in wrong indicators for making decisions.

Also, the presently disclosed system is applicable to governments for exploring issues related to the citizens according to their genders and their age groups. Another application is for criminal and forensic investigation where the information obtained may be used as evidence. An important application of the disclosed system is for adaptive and interactive educational systems. The content adaptive educational systems can be presented for beneficiaries according to their gender, age and emotions. The disclosed system may also be applicable in TV talk shows, video conferences, and video messaging. Consequently, the system supports decision making in a wide spectrum of applications including product marketing, customer service, politics, health care, financial services, etc.

A scenario for application of the system may be as follows. Assume a company needs to mine and analyze reviews of its products. The company may collect the product reviews directly or indirectly. The company may directly ask customers and record the corresponding reviews then analyze the collected data. In the indirect approach, it can collect data from different social media platforms and analyze the content using the different modalities. The company may analyze the reviews according to age or gender.

FIG. 1 outlines the framework of the disclosed multi-modal engine, for example an engine that is tailored to analyze persons in videos and train one or more machine learning-based classification models to classify the data. The multi-modal engine takes a video as input and processes it as three modalities: audio, textual and visual. The output of the engine is the sentiment, gender and age group of a person in the video. The system may be composed of several modules that may be performed in a computer system, including Data acquisition module 110, Feature Extraction module 120, Model Generation and Classification module 140, as well as Multimodal Data repositories 130.

The Data Acquisition module 110 is configured to perform several tasks including collection 111, segmentation 113, video and audio separation 115, transcription 117 and annotation 119. The tasks may be performed as individual tasks on a computer workstation or using specialized cloud services. Alternatively, the tasks may be performed as a fully automated process in a computer system. The collection task 111 may involve collection of video and audio from various sources, and may involve collection of video and audio in various formats. Also, the video and audio may be obtained as a stream or from a file. Common video file formats include WebM, Audio Video Interleave (AVI), Flash Video format (FLV), Windows Media Video (WMV), Apple QuickTime Movie (MOV), Moving Pictures Expert Group 4 (MP4). The video file may be compressed, in which case it will need to be uncompressed by a program which can decode the file. A video file may also contain synchronization information, subtitles, and metadata.

Disclosed embodiments include a machine learning system, and in particular, a supervised learning algorithm. In some embodiments, the machine learning system may be trained using videos collected from one or more sources. Videos may be collected from Internet social media sites such as YouTube, Facebook, Twitter, Instagram, and others that provide video. Videos may be collected directly from business social media accounts or from private sources. Videos may be collected as video files or be obtained from a video streaming service. Video files may be in various video formats. Common file formats include QuickTime, Windows Media Video, MPEG (e.g., MPEG-1, MPEG-2, MPEG-4), and Flash Video, to name a few. The collection task 111 may involve grouping video files by file format.

Although, videos are disclosed as a source of video data, the video data is in the form of a sequence of video frames. Video data may also be in the form of a sequence of still images, such as those captured using time-lapse photography, or displayed in a slideshow. A sequence of still images obtained using time-lapse photography or from a slideshow may also be used as a source of video data in cases where a person is speaking. In such cases, time-lapse photography or a slideshow may be accompanied by recorded audio and/or text. For purposes of this closure, the term video may used to describe either a sequence of video frames or a sequence of still images.

The segmentation task 113 may involve sorting a collection of videos into negative and positive opinions, male and female genders, and two or more age groups to be used for training the machine learning system.

Video files typically include a container containing video data in a video coding format and audio data in an audio coding format. The video and audio separation task 115 may depend on the arrangement of information in a particular video file format, and may involve separation of the video file into the video data and the audio data and outputting the separated data to separate video and audio files.

Some video files or streams may include subtitles, or there may be subtitles available in separate files or databases. Some video files may only include audio data. In the case of audio data, a transcription task 117 may perform an operation to convert the audio file into text, and may include a transcription engine or access to a software-based transcription service that converts audio or audio/video files into text. High accuracy speech to text engines include Dragon Naturally Speaking and Google Cloud Speech-to-Text. Transcription software is also available for specialized areas such as law or medical.

The Feature Extraction module 120 may include several sub-modules specialized for handling specific modalities. The sub-modules may include a pre-processing module 121, a visual feature extraction module 123, an audio feature extraction module 125, a textual feature extraction module 127 and a fusion module 129. The visual feature extraction module 123, acoustic feature extraction module 125 and the textual feature extraction module 127 may operate in parallel. In some embodiments, the visual feature extraction module 123 may operate using a video stream as input. The Preprocessing module 121 is configured to perform some pre-processing steps. In particular, each audio input signal may be stored in "WAV" format, 256 bit, 48000 Hz sampling frequency and a mono channel. Preprocessing operations for text may include normalizing characters or words that have different forms into a single representation. For example, Arabic characters such as Alefs and Tah Marbotah have different forms. Such characters in a text may be normalized into a single form. Each video input may be normalized after detecting faces. For example, each video input may be adjusted to a predetermined scale.

A feature extractor 123, 125, 127 is configured for each modality. The audio feature extractor 125 is configured to construct feature vectors of 68 features for each instance. A textual feature extractor 127 is configured to extract textual features based on word embeddings 137. For each instance, the textual feature extractor 127 may extract 300 textual features which are equal to dimensionality of vectors in word2vec models 139. The visual feature extractor 123 is configured to extract 800 features for each input. Extracted video data 131, audio data 133 and textual data 135 may be stored in a Multimodal Data repository 130. The extracted features are then fused together in a fusion module 129.

The Model Generation and Classification module 140 uses the extracted feature vectors to train a Support Vector Machine (SVM) that can detect sentiments, genders, and age groups of users from audio, textual and visual modalities. Several evaluation models may be evaluated. A Visual Modality Model 141 may be generated using only visual features obtained from the visual feature extraction process 123. An Audio Modality Model 143 may be generated using only audio features obtained from the acoustic feature extraction process 125. A textual modality model 145 may be generated using only textual features obtained from the textual feature extraction process 125. A Bimodality Model 147 may be generated using a combination of visual features and audio features, a combination of visual features and textual features, or a combination of audio features and textual features. A Multimodality Modality Model 149 may be generated using a combination of visual features, audio features and textual features.

A SVM classification model may be generated for each model 141, 143, 145, 147 and 149. Each SVM classification model may be generated for binary classification. Each SVM classification model may be generated for multi-class classification using a one versus the rest strategy.

Computer System

Figure 2:
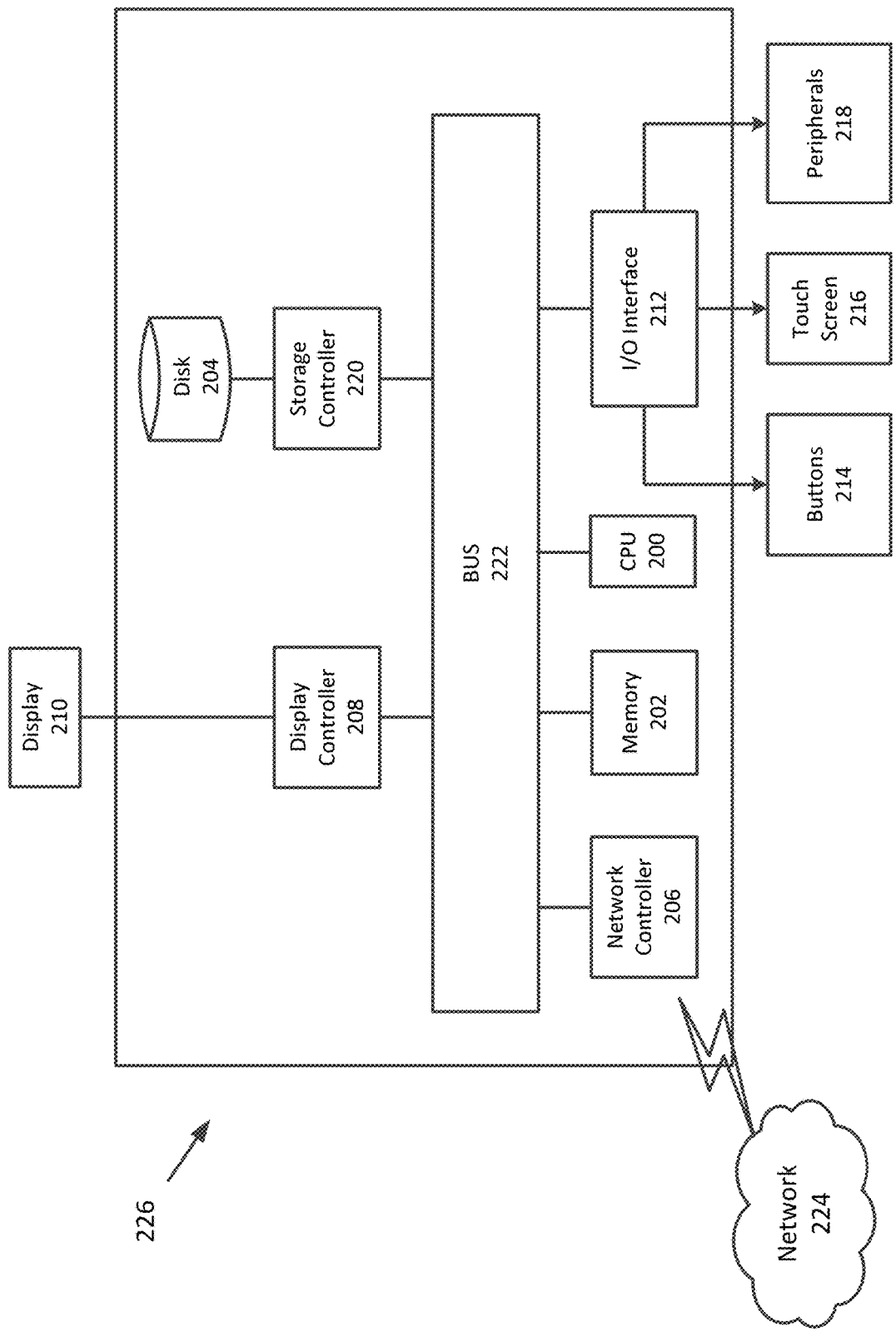
FIG. 2 is a block diagram of a computer system in accordance with an exemplary aspect of the disclosure.

In one implementation, the modules, model generation and classification processes, and data repositories may be implemented by a computer system 226. A hardware description of the computer system 926 according to exemplary embodiments is described with reference to FIG. 2. In FIG. 2, the computer system 226 is implemented as circuitry, including a CPU 200 which performs the processes described herein. In some embodiments, a preprocessing module, a feature extraction module, a fusion module and classification module have been developed in the Python programming language. A textual extraction sub-module has been implemented using the Gensim package. An acoustic features extraction sub-module has been implemented using the PayAudioAnalysis package. A visual features extraction sub-module has been implemented using the OpenCV tool. A feature reduction and machine learning classification system has been implemented using the Scikit-learn package. See Řeůůek, R., Sojka, P.: Software Framework for Topic Modelling with Large Corpora. In: Proceedings of the LREC 2010 Workshop on New Challenges for NLP Frameworks. pp. 45-50. ELRA, Valletta, Malta (May 2010), is.muni.cz/publication/884893/en; Giannakopoulos, T.: pyaudioanalysis: An open-source python library for audio signal analysis. PloS one 10(12) (2015); and Kaehler, A., Bradski, G.: Learning OpenCV 3: Computer Vision in C++ with the OpenCV Library. O'Reilly Media, Inc. (2016), all incorporated herein by reference in their entireties. The Scikit-learn package is used for evaluation of feature reduction and classification. See Pedregosa, F., Varoquaux, G., Gramfort, A., Michel, V., Thirion, B., Grisel, O., Blondel, M., Prettenhofer, P., Weiss, R., Dubourg, V., et al.: Scikit-learn: Machine learning in python. Journal of Machine Learning Research 12,2825-2830 (2011), incorporated herein by reference in its entirety.

The process data and instructions may be stored in memory 202. These processes and instructions may also be stored on a storage medium disk 204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 926 communicates, such as a server, external computer, or cloud service.

Further, the advancements may be provided as a utility application, background daemon, or component of an operating system, or combination thereof, executing in conjunction with CPU 200 and an operating system such as Microsoft® Windows®, UNIX®, Oracle® Solaris, LINUX®, Apple macOS® and other systems known to those skilled in the art.

In order to achieve the computer system 226, the hardware elements may be realized by various circuitry elements, known to those skilled in the art. For example, CPU 200 may be a Xenon® or Core® processor from Intel Corporation of America or an Opteron® processor from AMD of America, or may be other processor types that would be recognized by one of ordinary skill in the art. Alternatively, the CPU 200 may be implemented on an FPGA, ASIC, PLD or using discrete logic circuits, as one of ordinary skill in the art would recognize. Further, CPU 900 may be implemented as multiple processors (i.e., multiple cores) cooperatively working in parallel to perform the instructions of the inventive processes described above.

The computer system 226 in FIG. 2 also includes a network controller 206, such as an Intel Ethernet PRO network interface card from Intel Corporation of America, for interfacing with network 224. As can be appreciated, the network 224 can be a public network, such as the Internet, or a private network such as LAN or WAN network, or any combination thereof and can also include PSTN or ISDN sub-networks. The network 224 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer system 226 further includes a display controller 208, such as a NVIDIA® GeForce® GTX or Quadro® graphics adaptor from NVIDIA Corporation of America including a graphics processing unit (GPU), or Radeon visual processing unit (VPU) from Advanced Micro Devices (AMD), for interfacing with display 210, such as a Hewlett Packard® HPL2445w LCD monitor. A general purpose I/O interface 212 interfaces with a keyboard and/or mouse 214 as well as an optional touch screen panel 216 on or separate from display 210. General purpose I/O interface also connects to a variety of peripherals 218 including printers and scanners, such as an OfficeJet® or DeskJet® from Hewlett Packard®.

The general purpose storage controller 220 connects the storage medium disk 204 with communication bus 222, which may be an ISA, EISA, VESA, PCI, or similar, for interconnecting all of the components of the computer 226. A description of the general features and functionality of the display 210, keyboard and/or mouse 214, as well as the display controller 208, storage controller 220, network controller 206, and general purpose I/O interface 212 is omitted herein for brevity as these features are known.

Video Corpus Preparation and Collection

An important aspect of machine learning is the data used in training. In particular, it has been determined that machine learning algorithms perform well when they are trained with a large enough data set. Training machine learning algorithms with insufficient data can lead to unreasonable effectiveness. Machine learning algorithms may generalize well if they are not trained using data that represents the new data to be generalized to. If the training data set is too small, the training set may not adequately represent new data. Insufficient ability to generalize may also occur if the machine learning algorithm overfits the data. Also, if the training data is full of errors, outliers, and noise, the machine learning system may not perform adequately. Subsequently, disclosed embodiments use multimodal training data to generate a machine learning model.

Figure 3:
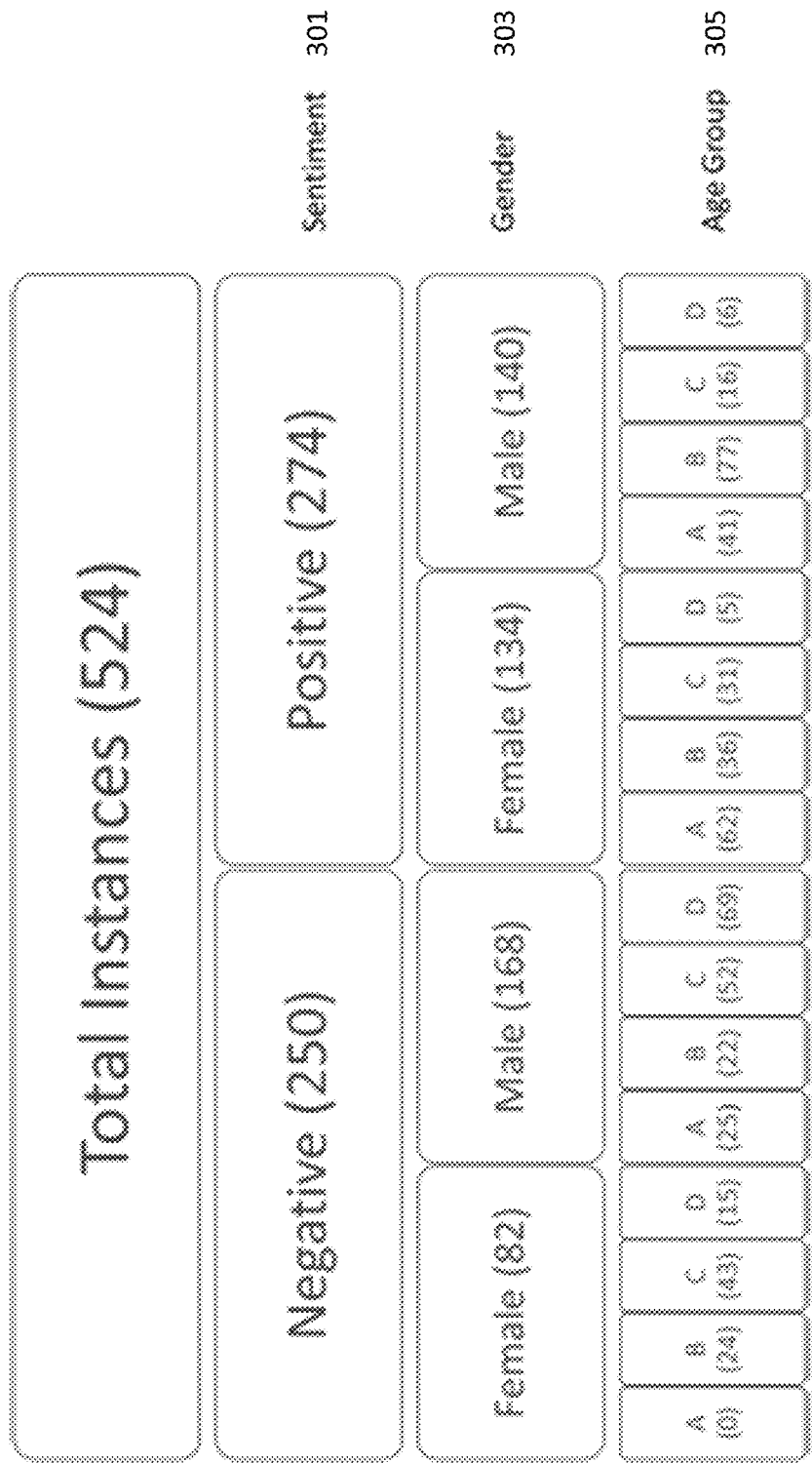
FIG. 3 illustrates the summary of the dataset.

In an exemplary embodiment, a video corpus was collected from YouTube. FIG. 3 provides an outline of the collected data set. It is composed of 63 opinion videos expressed by 37 males and 26 females. The videos are segmented into 524 sentiment opinions 301 distributed as 250 negative and 274 positive utterances. The utterances are distributed in accordance to gender 303 as 308 utterances by males and 216 utterances by females. The topics belong to different domains including reviews of products, movies, cultural views, etc. They are expressed in the various Arabic dialectics including: Egyptian, Levantine, Gulf, Iraqi, Moroccan, and Yemeni using various settings. The collected videos were recorded by users in real environments including houses, studios, offices, cars or outdoors. Users express their opinions in different periods.

The age groups 305 are defined as four classes: Age-group A (young adults) ranging from 15 to 29 years old; Age-group B (middle-aged I) ranging from 30 to 39 years old; Age-group C (middle-aged II) ranging from 40 to 49 years old; and Age-group D (senior) for people older than 49 years.

Annotation is an important task for supervised learning-based classification problems. Annotation 119 is conducted carefully and systematically to assign the sentiment for utterances and age for speakers. Three annotators were involved for sentiment annotation. For age group annotation, the ages of well-known speakers were determined by looking for their ages in their profiles and assigned their age by subtracting date of recording videos from their birthdays. For the remaining speakers who we couldn't find their birthdays, four annotators were involved to assign their ages.

For age group annotation, Age-group A (young adults) was annotated for 128 utterances; Age-group B (middle-aged I) was annotated for 159 utterances; Age-group C (middle-aged II) was annotated for 142 utterances; and Age-group D (senior) was annotated for 95 utterances.

Feature Extraction Module

Further detailed description of the feature extraction module 120 will be provided. In an exemplary embodiment, the video corpus may be separated by the video audio separation task 115 into multiple modalities of visual and audio, and textual features may be obtained from the transcribed audio by the transcription task 117 of the Data Acquisition Module 110. In some embodiments, data for acoustic and textual modalities may be obtained from data sources other than video files. For example, audio only sources such as podcasts or interview audio recordings may be used.

Figure 4:
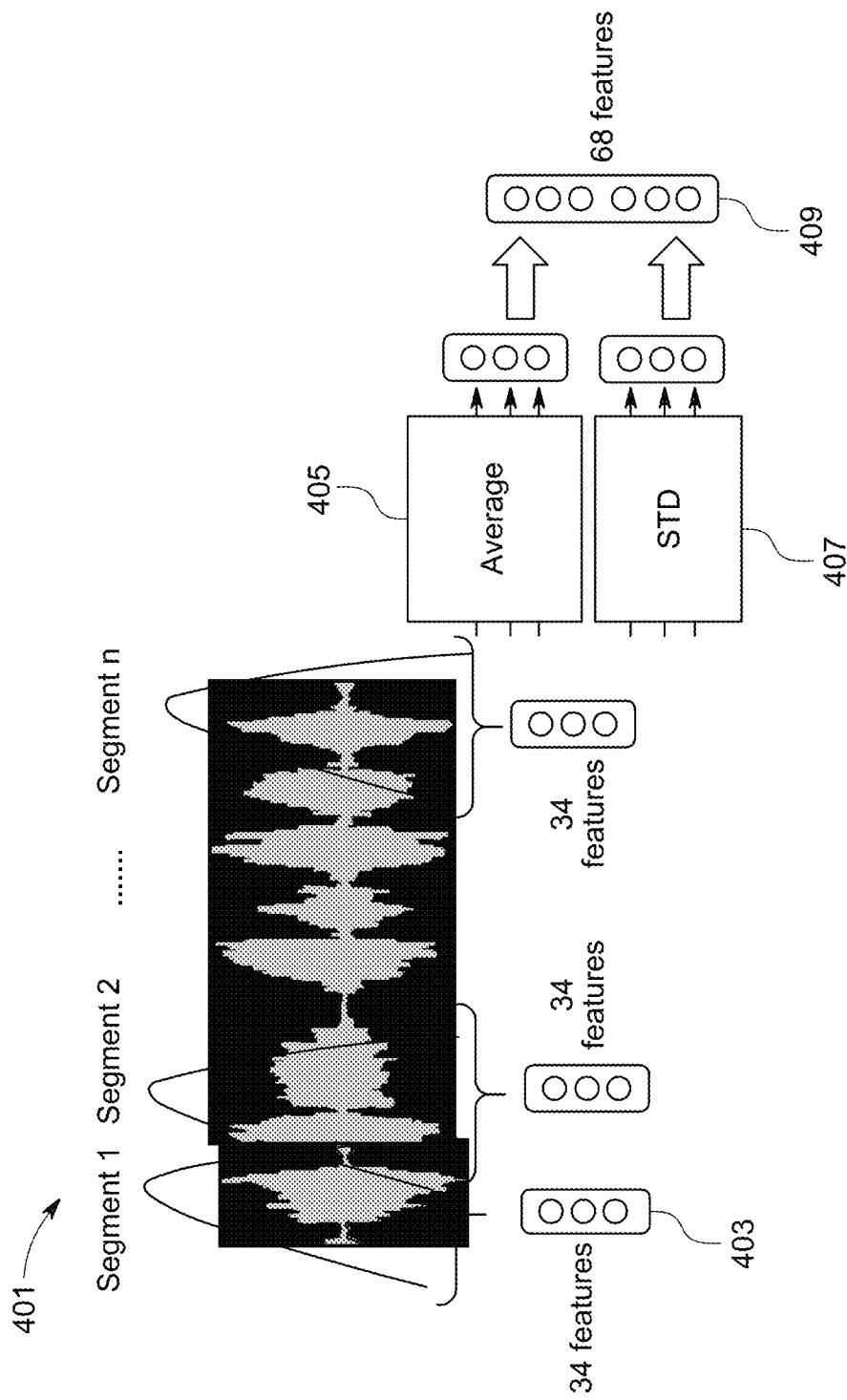
FIG. 4 illustrates the audio feature extraction process.

In order to train a machine learning model, the Feature Extraction Module 120 may extract a set of features for respective modalities. FIGS. 4, 5 and 6 are diagrams for the acoustic, textual and visual features extraction processes, respectively.

FIG. 4 is a diagram for the Acoustic features extraction process of sub-module 125 which extracts features related to speech signals, especially those features that may indicate emotion of the person speaking. In some embodiments, speech signal features, particularly for speech emotion recognition, may include prosodic features and spectral features. Prosodic features may be defined as patterns of stress and intonation in a language, and may include pitch of the voice, Zero Crossing Rate (ZCR), length of sounds, intensity (loudness), speech rate (speaking rate), and timbre of vowel (frequency, such as frequency response from a linear prediction filter). Prosodic features are influenced by vocal fold activity and occur when sounds are put together in a connected speech. See Kuchibhotla, S., Vankayalapati, H., Vaddi, R., Anne, K. R.: A comparative analysis of classifiers in emotion recognition through acoustic features. International Journal of Speech Technology 17(4), 401-408 (2014), incorporated herein by reference in its entirety. Prosodic features of a persons' speech may be indicative of emotion. For example, an emotion such as anger may have a variance in pitch and an average energy. A happy emotion may have less variation of pitch. A sadness emotion may have the lowest variation of pitch and weak energy. An emotion such as fear may have a high variation range of pitch and high energy.

On the other hand, spectral features, such as how throaty a voice is, how long one makes a certain sound, are influenced by vocal tract activity and are extracted from spectral content of the speech signal. Spectral features may include MFCC (Mel Frequency Cepstral Coefficients), LPCC (Linear Prediction Cepstral Coefficients), LFPC (Log Frequency Power Coefficients), formants etc. Spectral features help improve accuracy of speech recognition as they characterize temporal variations of the speech signal.

As illustrated in FIG. 4, circuitry configured to perform the Acoustic features extraction process 125 splits an input audio signal into short-term frames or windows of 0.05 millisecond (Segments 401). For each generated frame (segment 401), the circuitry computes a set of 34 features 403, including: (1) ZCR, (2) Energy, (3) Entropy of Energy, (4) Spectral Centroid, (5) Spectral Spread, (6) Spectral Entropy, (7) Spectral Flux, (8) Spectral Rolloff, (9-21) MFCCs, (22-33) Chroma Vector, (34) Chroma Deviation. Then, in some embodiments, the circuitry may compute statistics from each audio's segments 401 to represent the whole audio using one descriptor such as the Average 405 (mean) and Standard Deviation 407. In an exemplary embodiment, the circuitry may perform Average and Standard Deviation calculations using functions or APIs available in a programming language such as Python. Then, the circuitry outputs a vector for each audio, for example, of 68 (34×2) features 409. Although acoustic features of a persons' speech signal provide indications of emotion, the textual aspect of the persons' speech may also help to characterize the sentiment of the person. A unit of text of the person's speech is an utterance. An utterance is defined as an uninterrupted chain of spoken or written language. In the case that a video contains a conversation between a person and others, an utterance may be a statement by the person before the person is interrupted, or receives a response from others. A video may contain several utterances. FIGS. 5A and 5B are a diagram for textual feature extraction process of sub-module 127. As illustrated in FIG. 5A, circuitry configured to perform the textual feature extraction process 127 receives an input utterance S501, and tokenizes S503 the utterance. In some embodiments, an utterance is text for an entire video segment. In some embodiments, an utterance is divided into portions of a predetermined length. It should be understood that the length of an utterance is dependent on the physical limits of the circuitry that performs the feature extraction process. Also, text may take the form different types of natural languages. In some embodiments, the text may be for Arabic dialectics including: Egyptian, Levantine, Gulf, Iraqi, Moroccan, and Yemeni. However, the disclosure is not limited to a particular natural language. In some embodiments, text may be for other dialects found throughout the world. The circuitry may tokenize S503 an utterance using a tokenizer, preferably one that is suitable for a given natural language. An example of a tokenizer is nitk.tokenize available at nitk.org, which can be configured for different natural languages, with text in Unicode or ASCII. The type of tokens produced by the tokenizer may be configured, and typically include words or parts of words.

In S505, the circuitry may perform textual feature extraction using a word to vector method, such as word2vec. In S507, the circuitry may concatenate the vectors for the input utterance and, in S509, process using a word embedding matrix 505. Word embedding based features may be considered using the word embedding matrix 505. In FIG. 5B, a word embedding matrix 515 is characterized by the length of the utterance n and the length of the vector d. Word embedding techniques are recognized as an efficient method for learning high-quality vector representations of words from large amounts of unstructured text data. They refer to the process of mapping words from a vocabulary to real-valued vectors such that elements with similar meaning have a similar representation.

The word2vec word embedding method efficiently computes word vector representations in a high-dimensional vector space. See Mikolov, T., Chen, K., Corrado, G., Dean, J.: Efficient estimation of word representations in vector space. In: Proceedings of Workshop at International Conference on Learning Representations (2013); and Mikolov, T., Sutskever, I., Chen, K., Corrado, G. S., Dean, J.: Distributed representations of words and phrases and their compositionality. In: Advances in Neural Information Processing Systems. pp. 3111-3119 (2013), each incorporated herein by reference in their entirety. Word vectors are positioned in the vector space such that words sharing common contexts and having similar semantics are mapped nearby each other. Word2vec generally may be performed using one of two neural network architectures: continuous bag-of-words (CBOW) and skip-grams (SG). CBOW and SG have similar algorithms but the former is trained to predict a word given a context whereas the latter is trained to predict a context given a word. Word embedding-based features have been adopted for different Arabic NLP tasks and achieve the highest results compared to other traditional features. See Al-Azani, S., El-Alfy, E. S. M.: Combining emojis with arabic textual features for sentiment classification. In: 9th IEEE International Conference on Information and Communication Systems (ICICS). pp. 139-144 (2018), incorporated herein by reference in its entirety.

In one embodiment, the word2vec method uses the skip-grams model, which has been trained from a Twitter dataset with a dimensionality of 300 and used to derive textual features. See Soliman, A. B., Eissa, K., El-Beltagy, S. R.: Aravec: A set of arabic word embedding models for use in arabic nlp. In: Proceedings of the 3rd International Conference on Arabic Computational Linguistics (ACLing). vol. 117, pp. 256-265 (2017), incorporated pherein by reference in its entirety. As illustrated in FIG. 5B, the circuitry may generate a feature vector 519 for each utterance by averaging 517 the embeddings (output of word embedding matrix step S509) of that utterance.

Figure 6A:
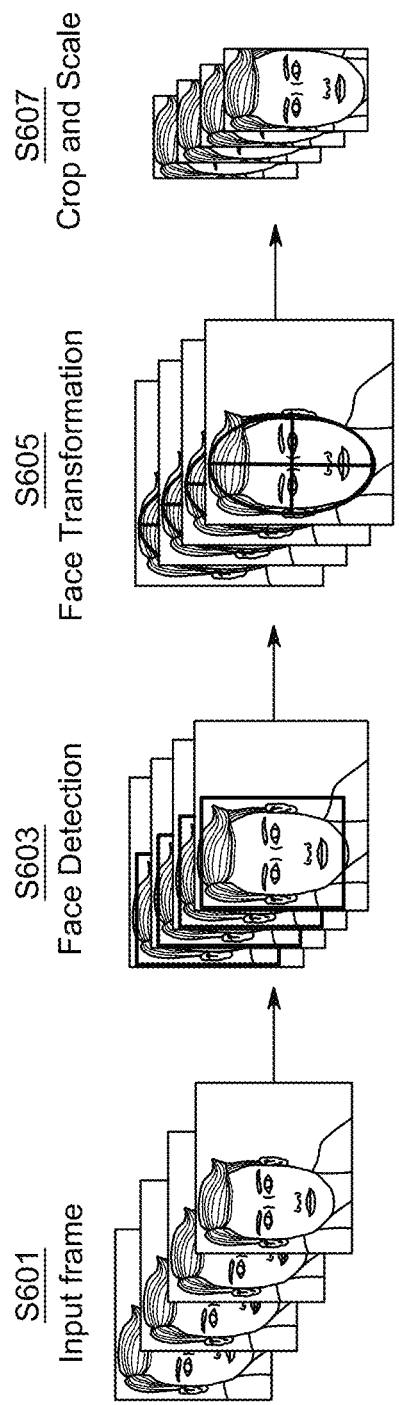
FIGS. 6A, 6B illustrate (a): Face detection process, (b) combined ORB and dense optical flow features extraction process.
Figure 6B:
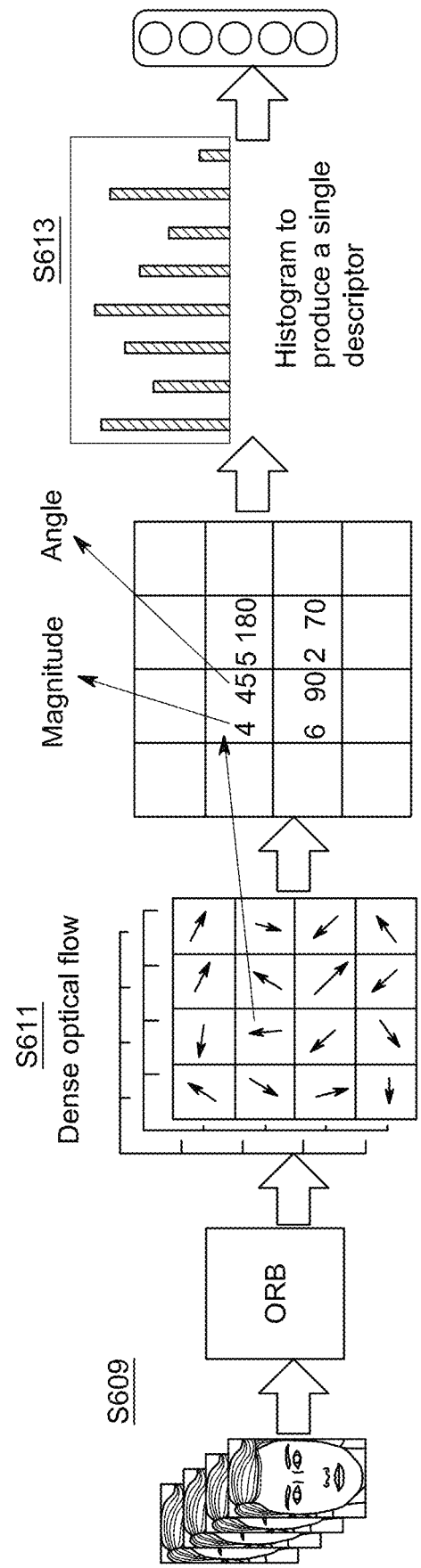

In addition to acoustic features and textual features, visual features have been found to further enhance the feature set that characterizes a person's sentiment. For example, in some cases, the words spoken may indicate the sentiment of a person. In other cases, the acoustic features of the person's speech may indicate the persons' sentiment. In further cases, the visual feature of a person may indicate the sentiment of the person. Still further, a combination of the words, acoustic features and visual features may fully characterize a persons' sentiment. FIGS. 6A and 6B are a diagram for visual feature extraction. In order to evaluate sentiment based on visual features, the face of the person of interest in a video is analyzed for movement of image portions of the face between video frames in order to capture features of the person's facial expressions that may indicate positive or negative opinion.

An initial set of processes may be performed in order to extract the face of the person of interest from each video frame. As illustrated in FIG. 6A, circuitry configured to perform the visual feature extraction process 123 receives, in S601, a sequence of input frames. In some embodiments, one or more of the sequence of input frames may be stored in a buffer. In some embodiments, a predetermined number of frames may be input to the circuitry, either directly from a source or from the buffer, at a time. In S603, the face of a person of interest is detected and the face in each frame is segmented from the rest of a given frame. In some embodiments, the video is of a single person, such that only one face appears in the video frames. In a case that the video contains several persons, a person may be selected as a primary person of interest. Selection of a person from among multiple persons in a video may be made using a pointer, or may be made based on the analysis of the audio data by the pacoustic feature extraction process. The circuitry may perform face detection using a general frontal face detector. Also, the circuitry may use a general eye detector. See Viola, P., Jones, M. J.: Robust real-time face detection. International Journal of Computer Vision 57(2), 137-154 (2004), incorporated herein by reference in its entirety. The frontal face detector may be based on HAAR features and may combine increasingly more complex classifiers in a cascade to detect a face. See Viola, P., Jones, M.: Rapid object detection using a boosted cascade of simple features. In: Proceedings of the IEEE Computer Society Conference on Computer Vision and Pattern Recognition (CVPR). vol. 1, pp. I-I (2001), incorporated herein by reference in its entirety. In addition, in S605, the circuitry may perform face transformation based on eye position. An eye detector may detect eye positions which provide significant and useful values to, in S607, crop and scale the frontal face to a size of 240×320 pixels in an exemplary embodiment.

After initial processes are performed to obtain cropped and scaled face images, further processing may be performed to extract specific face features that may be indicative of sentiment. In S609, the circuitry may apply an ORB (Oriented FAST and Rotated BRIEF) technique to extract local descriptors from each frame in a video. See Rublee, E., Rabaud, V., Konolige, K., Bradski, G.: Orb: An efficient alternative to sift or surf. In: IEEE International Conference on Computer Vision (ICCV). pp. 2564-2571 (2011), incorporated herein by reference in its entirety. ORB is a hybrid modified version of the FAST keypoint detector and the BRIEF descriptor. FAST is a method for finding keypoints, particularly corner keypoints, in real-time systems that match visual features. FAST may be augmented with pyramid schemes for scale and a Harris corner filter to reject edges and provide a reasonable score. However, FAST features do not have an orientation component. The BRIEF descriptor is a bit string description of an image patch constructed from a set of binary intensity tests. The feature is defined as a vector of binary tests.

In the ORB technique, first, a FAST detector is applied to find key points in an image frame. FAST takes an intensity threshold between the center pixel and those in a circular ring about that center. Typically, a circular radius of 9 is used for reasonable performance. Then, to obtain a measure of cornerness, a Harris corner measure is used to find top N key points among them. In order to produce multi-scale-features, a scale pyramid of the image frame is used and FAST features are produced at each level in the pyramid.

For computing orientation, the ORB approach uses a measure of corner orientation, referred to as an intensity centroid. The intensity centroid makes use of an assumption that a corner's intensity is offset from its center. In particular, the ORB approach includes calculation of the intensity weighted centroid of a patch with located corner at center. The orientation can be found as the direction of a vector from this corner center point to the centroid.

To improve the rotation invariance, moments may be computed with x and y which should be in a circular region of radius r, where r is the size of the patch.

The ORB approach is used to draw the keypoint locations for each video frame.

In some embodiments, a histogram of dense optical flow is computed from the resultant image. In particular, in S611, the circuitry applies a dense optical flow technique to extract the global descriptors. Dense optical flow describes the motion of each pixel in terms of the angle (direction) and magnitude from each two consequence frames for a video. Similar to Ryoo et al., in S613, the circuitry computes a histogram to summarize the extracted optical flows as a feature vector. See Ryoo, M. S., Matthies, L.: First-person activity recognition: What are they doing to me? In: Proceedings of the IEEE Conference on Computer Vision and Pattern Recognition. pp. 2730-2737 (2013), incorporated herein by reference in its entirety. The optical flows may be grouped into multiple types based on their directions, and a count of the number of optical flows belonging to each group may be determined. In one embodiment, the optical flows are spatially divided into a scene of 10 by 10 grids and 8 representative motion directions: {0-45, 46-90, 91-135, 136-180, 181-225, 226-270, 271-315, 316-360}.

Figure 7:
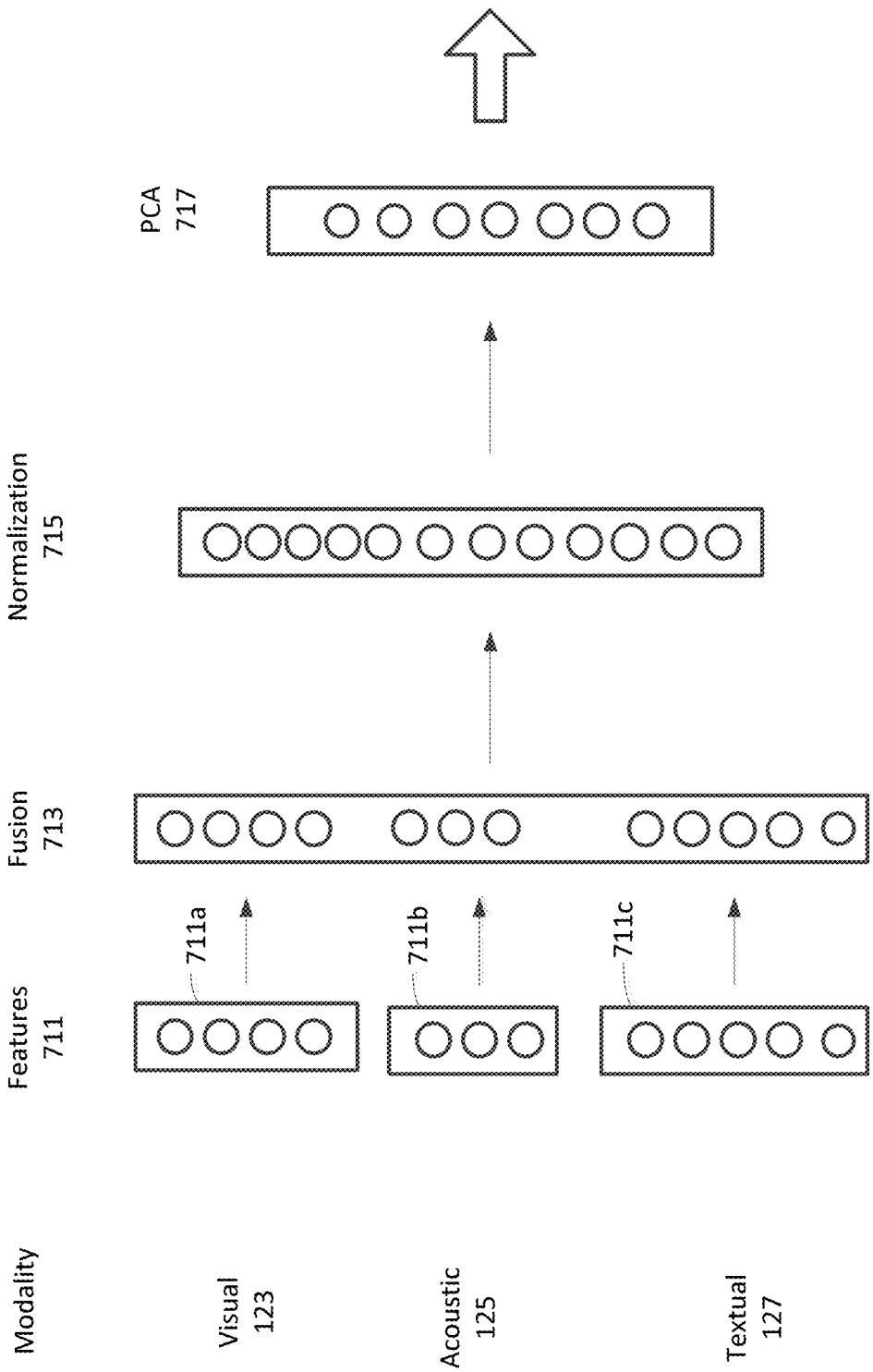
FIG. 7 illustrates the fusion of visual, audio and text modalities process.

In order to train a machine learning model, the set of extracted features is preferably made into a format that can be provided as an input. FIG. 7 is a diagram of a fusion process to generate the formatted input. Videos may have one to three modalities: audio, visual (sequence of frames), and/or text. In some embodiments, circuitry for performing the fusion process 129 may fuse together features extracted for the modalities into one vector. Feature level fusion may be carried out by concatenating the extracted features of visual 123, acoustic 125 and textual 127 modalities. In some embodiments, combinations of two modalities may be used to generate one or more bimodality models 147. The output of each individual modality process 123, 125 and 127 may be represented as a vector. $F=\{f_1, f_2, \ldots, f_n\}$, $F \in R^n$, represents the textual feature vector 711c with length n and $A=\{a_1, a_2, \ldots, a_m\}$, $A \in R^m$, represents the acoustic feature vector 711b with size m and V={v₁, v₂, ..., v_o}, V ∈ R^k, represents the visual feature vector 711a with size k. The circuitry may concatenate individual modality vectors F, A and E to form a fused vector 713. In some embodiments, the fusion process may instead fuse together pairs of feature modalities for a bimodality model 147.

In addition, two inherent issues may arise when fusing features and need to be addressed, namely the scaling and curse of dimensionality. The former arises due to the feature values extracted using different methods scaled differently. Moreover, some features might be redundant or noisy. The later issue arises because a feature vector with a large number of features may have such a high dimensionality that any new data may not fall into a classification, i.e., be misclassified. These two issues may be handled through feature normalization and dimensional reduction. The circuitry may perform a normalization operation 715 to normalize each feature to be between 0 and 1 using min-max scheme:

$$x' = \frac{x - x_{min}}{x_{max} - x_{min}}$$

where x' is the normalized value corresponding to x which falls in the range from $x_{min}$ to $x_{max}$.

For dimensional reduction, the circuitry may perform Principal Component Analysis (PCA) 717 with the criteria to select a number of components such that the amount of variance that needs to be explained is greater than 99% confidence. PCA first finds the principal components of the normalized feature vectors. Provided all of the principal components, the dimensionality can be reduced down to d dimensions by projecting onto the hyperplane defined by the first d principal components. Each normalized feature vector may then be reduced down to a dimensionally reduced feature vector.

The resulting reduced dimension feature vectors may be used to train a Machine Learning Model for classification. In an exemplary embodiment, the resulting reduced feature vectors are of length 34. The type of classification that may be performed for the data, as summarized in FIG. 3, is multilabel and multiclass. The multiple types of labels may include sentiment, gender and age group. Other types of labels may include combinations such as sentiment-gender, sentiment-age group and gender-age group, as well as sentiment-gender-age group. Age group is multiclass as it may have more than two classes, such as young, middle-age, and senior.

Training

In some embodiments, the Machine Learning Model may be one that is trained by supervised learning. The Support Vector Machine (SVM) learning model may be used as it is good at performing classification on complex data sets. However, the SVM classification model is a binary classifier, i.e., classifies into one of two possible classes. In order to use the SVM for multi-class classification, more than two possible classes, the classification system 140 may be configured to include a number of binary classifiers to handle the number of different classes beyond two. This strategy is referred to herein as one versus the rest strategy.

In this disclosure, the classes correspond to the grouping of data as shown in FIG. 3. In disclosed embodiments, the classes for sentiment are Positive and Negative. The classes for gender are Male and Female. The classes for age group are Young adults A, Middle-aged I B, Middle-aged II C, and Senior D. Thus, in disclosed embodiments, there are 8 classes.

Figure 8:
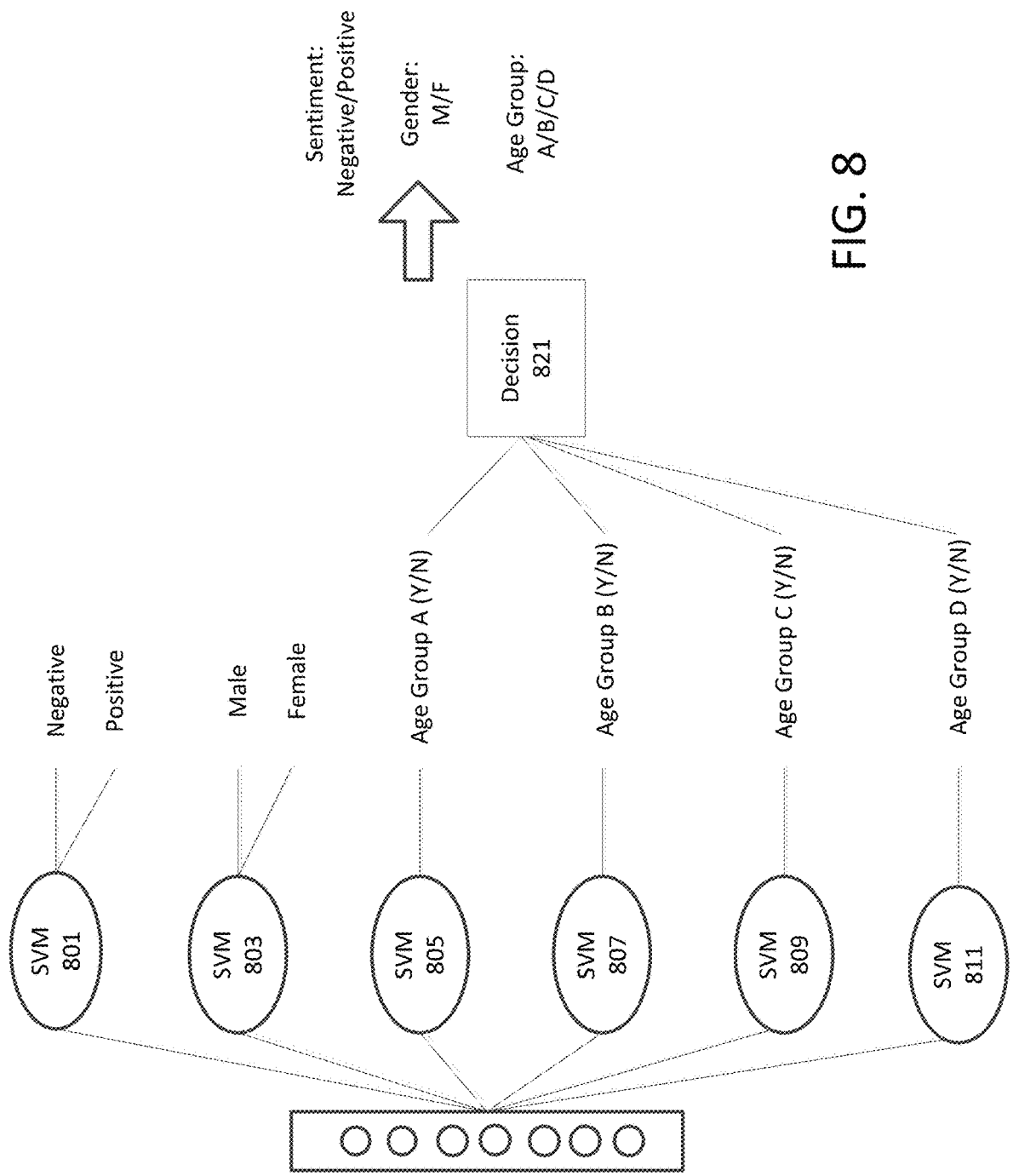
FIG. 8 is a block diagram of an SVM model in accordance with an exemplary aspect of the disclosure.

As shown in FIG. 8, six SVM models may be trained in order to classify a set of reduced feature vectors in terms of sentiment, gender and age group. Each SVM classifier may be trained with the same training set of reduced feature vectors from the PCA 717 (representing all three modalities of visual, acoustic and textual) as input vectors.

In one embodiment, an SVM model 801 may be trained as a binary classifier to classify between Negative and Positive sentiment. An SVM model 803 may be trained as a binary classifier to classify between Male and Female gender. Four SVM models 805, 807, 809 and 811 may be trained for each class of the multiple age group classes A, B, C and D. A decision component 821 may compare the results of the four SVM models to determine the age group class.

In some embodiments, SVM models may be trained for pairs of labels and for tri-labels. In the case of label pairs, one SVM model may be trained for each combination of Sentiment, Gender including: Negative-Female, Negative-Male, Positive-Female, Positive-Male; each combination of Sentiment, Age Group including: Negative-A, Negative-B, Negative-C, Negative-D, Positive-A, Positive-B, Positive-C, Positive-D; and each combination of Gender, Age Group including: Female-A, Female-B, Female-C, Female-D, Male-A, Male-B, Male-C, Male-D. In the case of tri-labels, one SVM model may be trained for each combination of Sentiment, Gender, and Age Group including: Negative-Female-A, Negative-Female-B, Negative-Female-C, Negative-Female-D, Negative-Male-A, Negative-Male-B, Negative-Male-C, Negative-Male-D, Positive-Female-A, Positive-Female-B, Positive-Female-C, Positive-Female-D, Positive-Male-A, Positive-Male-B, Positive-Male-C, Positive-Male-D.

In some embodiments, an SVM model may be trained for every pair of classes. Using this approach, N×(N-1)/2 SVM classifiers need to be trained for the multi-class of age group (in an exemplary embodiment, there are four age group classes).

Experiments and Results

Figure 9:
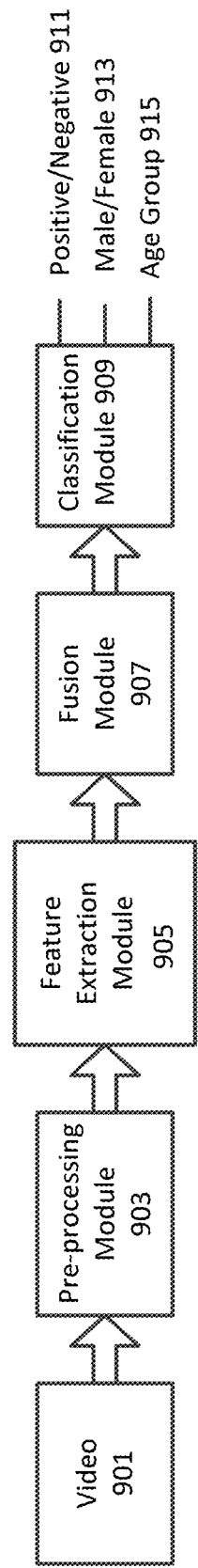
FIG. 9 is a block diagram of a production system in accordance with an exemplary aspect of the disclosure.

In order to evaluate the effectiveness of the disclosed system, an exemplary prototype has been developed. FIG. 9 is a block diagram of a production system used to implement the prototype. The components of the production system may include a pre-processing module 903, feature extraction module 905, fusion module 907 and classification module 909. The modules may be developed in Python.

In this evaluation, the SVM is used as the classification system 909. In order to use SVM for multi-class classification, the system is configured to include a number of binary SVM classifiers. In this evaluation, the label Sentiment 911 can be classified as Positive or Negative, the label Gender 913 can be classified as Male or Female, and the label Age Group 915 may be classified as A, B, C, D.

Experiments have been conducted on the developed video dataset using 10-fold cross validation evaluation mode in order to obtain more reliable performance measures. In 1-fold cross validation, a test data set is divided into 10 subsets called folds. In the prototype system, functions provided by the Gensim package are applied in the development of a textual features extraction process 127, functions provided in the PayAudioAnalysis package are utilized in the development of an acoustic features extraction process 125. Functions provided in the OpenCV tool are utilized in the development of a visual features extraction process 123. See Řehůřek, R., Sojka, P.: Software Framework for Topic Modelling with Large Corpora. In: Proceedings of the LREC 2010 Workshop on New Challenges for NLP Frameworks. pp. 45-50. ELRA, Valletta, Malta (May 2010), http://is.muni.cz/publication/884893/en; Giannakopoulos, T.: pyaudioanalysis: An open-source python library for audio signal analysis. PloS one 10(12) (2015); and Kaehler, A., Bradski, G.: Learning OpenCV 3: Computer Vision in C++ with the OpenCV Library. O'Reilly Media, Inc. (2016), incorporated herein by reference in their entirety. The Scikit-learn package is used for evaluation of feature reduction and classification. See Pedregosa, F., Varoquaux, G., Gramfort, A., Michel, V., Thirion, B., Grisel, O., Blondel, M., Prettenhofer, P., Weiss, R., Dubourg, V., et al.: Scikit-learn: Machine learning in python. Journal of Machine Learning Research 12,2825-2830 (2011), incorporated herein by reference in its entirety.

The performance of the prototype is evaluated in terms of a confusion matrix showing the distribution of predictions in relation to the actual categories. Also, the per class performance for terms of Precision (Prc), Recall (Rec) and $F_1$ measures are calculated. These measures are computed from the 10-fold cross validation output and are computed as follows for each class i:

$$Prc_i = \frac{\text{\# instances correctly classified as class } c_i}{\text{\# instances classified as class } c_i}$$

$$Rec_i = \frac{\text{\# instances correctly classified as class } c_i}{\text{\#instances actually in class } c_i}$$

$$F_{1i} = 2 \Big/ \left(\frac{1}{Prc_i} + \frac{1}{Rec_i}\right)$$

The overall accuracy (Acc) is calculated as follows:

$$Acc = \frac{\sum_i \text{\# instances correctly classified as class } c_i}{\text{\# instances}}$$

Figure 10:
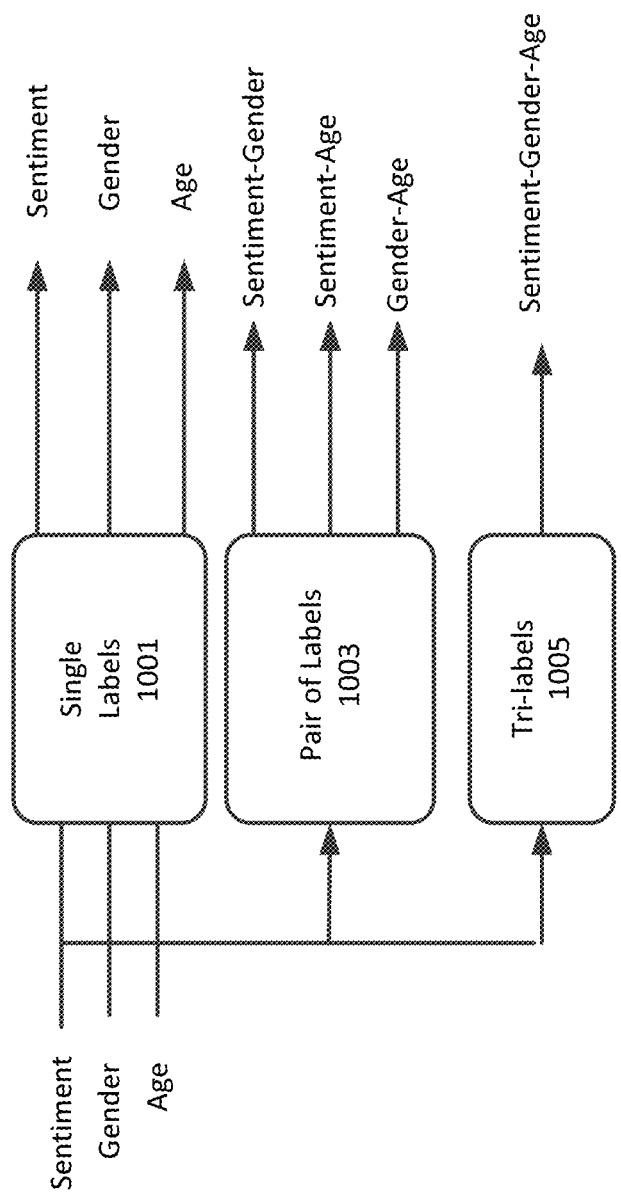
FIG. 10 illustrates the various combinations that are evaluated.

The performance measures of the system are analyzed for each individual label 1001 (Sentiment, Gender and Age), pairs of labels 1003 (Sentiment Gender, Sentiment Age, Gender Age), and for the three labels together 1005 (Sentiment Gender Age). Seven cases for evaluation are considered based on various combinations of sentiment, gender, and age groups as shown in FIG. 10.

FIGS. 11A and 11B show the confusion matrix for Sentiment classes {Negative (N), Positive (P)}, Gender {Female (F), Male (M)} and Age Group {A, B, C, D}, respectively. The system may be configured to distinguish with high accuracy between the various classes in each case. A multi-class classifier is one that can distinguish between more than two classes. The problem of multi-class classification is more challenging than binary classification. For example, the system has slightly decreased accuracy in the case of Age Groups due to the existence of four classes.

FIGS. 12A, 12B and 12C show the confusion matrix for each pair of labels: Sentiment_Gender, Sentiment_Age, and Gender_Age, respectively. The notation X_Y denotes the first label X and second label Y. For example, N_A means negative (N) sentiment and age group A. Again it can be observed that the system has correctly classified most of the instances, although sometimes few instances are confused to be of other types.

Finally, all the three labels are considered together and evaluated for the potential of the system to correctly recognize the tri-labels: Sentiment_Gender_Age. The results are shown in FIG. 13. The total number of combinations of the three labels are 16 (which is 2×2×4). The majority of instances are classified on the diagonal of the matrix, which indicates that they are correctly classified. Some cases have low number of instances and the system gives them less priority in favor of the major cases. For instance, case N_F_A has only zero instances and P_F_D has only five instances. By contrast, the case N_M_D has 69 instances of which the system correctly recognized 60.

Additionally, the per class performance is computed for the single label cases, pair of labels cases and tri-label cases. The results are shown in FIGS. 14A, 14B, 14C in terms of precision (Prc), recall (Rec) and $F_1$ measure. The accuracy and average per class performance is also depicted in FIG. 15. This demonstrates that the developed system has remarkable performance for single labels. But it starts to decrease when the combination of labels are considered. This makes sense since there are more cases that can be confused together. It can be seen that the disclosed multimodal system reports the highest accuracy for gender detection followed by sentiment detection and sentiment_gender detection.

As mentioned above, the disclosed system may recognize and report sentiment and demographic characteristics while a video is being played back. In order to accomplish sentiment recognition while a video is being played back, above described processes may be performed as parallel pipelines that are implemented on computer systems having one or more graphics processing units (GPUs). See, for example, the pipeline class provided in Scikit learn. In some embodiments, the disclosed system may be performed as a background process that is performed while the video is being played back.

Figure 16:
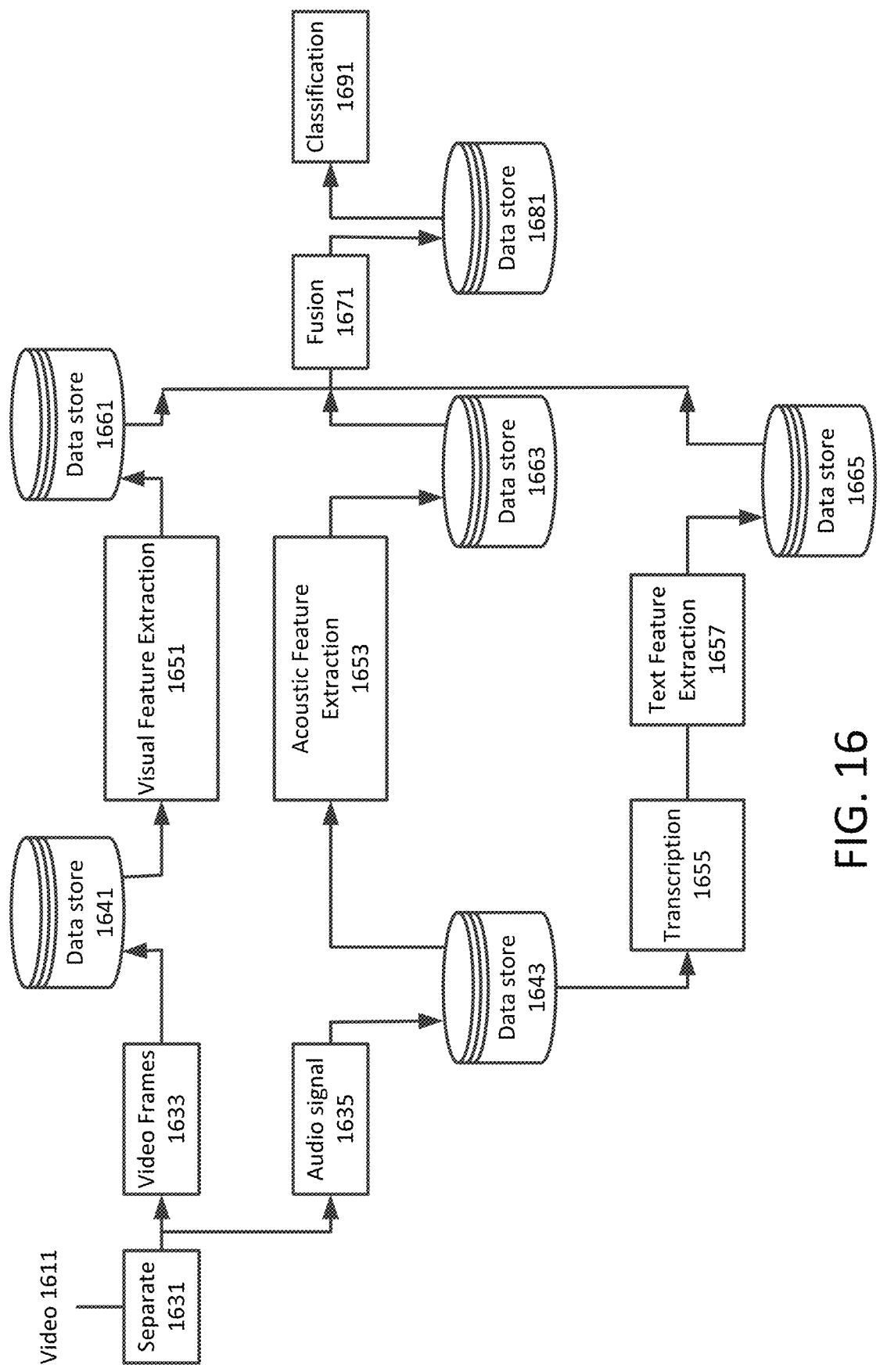
FIG. 16 is a block diagram of a production system having parallel tasks for real time processing in accordance with an exemplary aspect of the disclosure.

FIG. 16 is a block diagram of a production system having parallel pipelines for real time processing in accordance with an exemplary aspect of the disclosure. Each modality, video, audio, textual, may be processed in parallel, or in a synchronous parallel manner. In particular, pipelines associated with each modality may be processed independently in parallel, or may be processed in parallel in a synchronized manner. Synchronous-parallel processing may be performed, for example, in order to line up a portion of a video and a portion of an audio signal with an utterance as determined in the transcribed text, such that a feature vector is for a single utterance. As a video is being played by a playback device and displayed on a display device, the video 1611 may simultaneously be routed to the Data Acquisition Module 110, which includes a collection task 111, segmentation task 113, and video audio separation task 115 to perform separation 1631. The video frames are passed to a pipeline 1633 for preprocessing video frames, while the audio signal is passed to a pipeline 1635 for preprocessing audio frames. As video frames are preprocessed, they may be stored in a buffer or other data store 1641. Similarly, as audio signals are preprocessed, they may be stored in a buffer or data store 1643. The Visual Feature Extraction process 123 may be performed in a pipeline 1651. The Acoustic Feature Extraction process 125 may be performed in a pipeline 1653. The audio signals in data store 1643 may also be processed by processes 117, 127 to obtain textual data in a pipeline that includes a Transcription pipeline 1655 and a Textual Feature Extraction pipeline 1657. As visual feature vectors are determined in the Visual Feature Extraction pipeline 1651, they may be stored in a buffer or data store 1661. As acoustic feature vectors are determined in the Acoustic Feature Extraction pipeline 1653, they may be stored in a buffer or data store 1663. As textual feature vectors are determined in the Textual Feature Extraction pipeline 1657, they may be stored in a buffer or data store 1665. Vectors from the data stores 1661, 1663, 1665 may be input to a fusion pipeline 1671 which performs a fusion process 129. A resulting reduced vector may be stored in a buffer or data store 1681, or may be fed directly to the classification pipeline 1691. The classification pipeline 1691 outputs a sentiment, gender, and age group of a person of interest in the original video.

In some embodiments, the classification pipeline 1691 performs a classification process when the video has reached the end. In some embodiments, the classification pipeline 1691 performs a classification process after a predetermined amount of time from the start of the video.

In some embodiments, the predetermined amount of time is the length of time of an utterance of the person of interest.

FIG. 17 is a block diagram of a neural network implementation in accordance with an exemplary aspect of the disclosure. Although exemplary embodiments incorporate a Support Vector Machine (SVM) as the machine learning classification model, other binary classification models may be used in place of or in combination with SVM models. Also, SVM models are known to be good classifiers for small to medium sized training data sets. However, for large data sets, such as those that might be found in cloud-based social media environments, such as YouTube, neural network training models may be used. For example, a deep learning neural network model may be trained for the multimodality modality model, for all classes, including classes for sentiment, gender and age group. Neural network machine learning models may be trained with large data sets, such as thousands or even millions or more of training vectors.

FIG. 17 is a block diagram for a neural network architecture known as a deep learning architecture. Deep learning models include neural network architectures that have more than one hidden layer, hence, being referred to as deep. Conventionally, deep learning architectures with many hidden layers were considered difficult to train. However, faster and more powerful computers and large enough data sets have been found to make it possible to train complex deep learning neural networks. Regarding FIG. 17, a deep learning architecture with several hidden layers 1703 may be used as a classification model. The deep learning architecture may be trained with the same inputs 1701, reduced feature vectors obtained using PCA 717, as used for training the SVM model, and with the same classes as the SVM model. However, unlike an SVM that is a binary classifier, the deep learning architecture may be trained over the full set of classes 1705, including the four age group classes.

Numerous modifications and variations of the present invention are possible in light of the above teachings. It is therefore to be understood that within the scope of the appended claims, the invention may be practiced otherwise than as specifically described herein.

The invention claimed is:

1. A system determining a sentiment, a gender and an age group of a subject in a video, the system comprising:
a video playback device;
a display device; and
a computer system having circuitry,
the circuitry configured to
while the video is being played back by the video playback device on the display device, separate the video into visual data and audio data,
pass the visual data to a video processing pipeline and pass the audio data to both an acoustic processing pipeline and a textual processing pipeline,
perform, in parallel, a video feature extraction process in the video processing pipeline to obtain a visual feature vector, an acoustic feature extraction process in the acoustic processing pipeline to obtain an acoustic feature vector, and a textual feature extraction process in the textual processing pipeline to obtain a textual feature vector,
combine the visual feature vector, the acoustic feature vector, and the textual feature vector into a single feature vector, and
determine the sentiment, the gender and the age group of the subject by applying the single feature vector to a machine learning model,
wherein the circuitry extracts the visual features, for a plurality of frames of the video, by:
detecting the face of the subject,
segmenting the detected face from the rest of the video frame,
detecting a frontal face of the detected face,
cropping and scaling the frontal face to a predetermined number of pixels,
extracting local descriptors from each frame which include key points, orientation, and moments,
extracting global descriptors which include optical flow for the motion of each pixel between consecutive frames, and
generating a histogram of the optical flow.

2. The system of claim 1, wherein the age group is a multi-class of four age groups,
wherein the machine learning model is a plurality of support vector machines including one support vector machine for each of the four age groups, and
wherein the circuitry is configured to determine the sentiment, the gender and the age group of the subject by applying the single feature vector to each of the plurality of support vector machines and selecting a result from among the support vector machines for each of the four age groups.

3. The system of claim 1, wherein the circuitry including the machine learning model is trained using a plurality of visual feature vectors extracted from a plurality of videos of different subjects to classify each subject according to positive or negative sentiment, a plurality of acoustic feature vectors extracted from audio signals associated with the videos, and a plurality of textual feature vectors extracted from text derived from the audio signals.

4. The system of claim 3, wherein the circuitry is further configured to
extract visual features from a portion of each of the plurality of videos to obtain the plurality of visual feature vectors, acoustic features from a portion of an audio signal associated with the videos to obtain the plurality of acoustic feature vectors, and textual features from text for each utterance in the audio signal to obtain the plurality of textual feature vectors, and
combine the visual feature vector, acoustic feature vector, and textual feature vector for each of the plurality of videos into a plurality of respective single feature vectors.

5. The system of claim 1, wherein the circuitry extracts the visual features including determining an angle and a magnitude of each pixel for two consecutive frames of the video.

6. The system of claim 1, wherein the circuitry extracts the audio features including extraction of prosodic features and spectral features of the audio signal.

7. The system of claim 1, wherein the circuitry extracts the textual features including a preprocessing operation of normalizing Arabic characters that have different forms.

8. The system of claim 3, wherein the circuitry including the machine learning model is trained by labeling the age group as one of multiple age group classes including young adults, young-middle-aged, middle-aged, and senior.

9. The system of claim 1, wherein the circuitry that extracts the textual features includes a skip-grams neural network that generates a textual feature vector for each utterance.

10. The system of claim 1, wherein the circuitry performs reduction of the single feature vector to a vector of reduced dimension, and
wherein the circuitry determines the sentiment, the gender and the age group of the subject by applying the reduced feature vector to the machine learning model.

11. A method for determining a sentiment, a gender and an age group of a subject in a video, the method performed by a computer system having circuitry,
the method, performed by the circuitry as a background process, comprises:
while the video is being played back,
separating the video into visual data and audio data;
passing the visual data to a video processing pipeline and passing the audio data to both an acoustic processing pipeline and a textual processing pipeline;
performing, in parallel, a video feature extraction process in the video processing pipeline to obtain a visual feature vector, an acoustic feature extraction process in the acoustic processing pipeline to obtain an acoustic feature vector, and a textual feature extraction process in the textual processing pipeline to obtain a textual feature vector;
combining the visual feature vector, acoustic feature vector, and textual feature vector into a single feature vector;
determining the sentiment, the gender and the age group of the subject by applying the single feature vector to a machine learning model; and
outputting the sentiment, the gender and the age group of the subject,
wherein the extracting, by the circuitry, the visual features includes, for a plurality of frames of the video,
detecting the face of the subject;
segmenting the detected face from the rest of the video frame;
detecting a frontal face of the detected face;
cropping and scaling the frontal face to a predetermined number of pixels;
extracting local descriptors from each frame which include key points, orientation, and moments;
extracting global descriptors which include optical flow for the motion of each pixel between consecutive frames; and
generating a histogram of the optical flow.

12. The method of claim 11, wherein the age group is a multi-class of four age groups,
wherein the machine learning model is a plurality of support vector machines including one support vector machine for each of the four age group and
wherein the method, performed by the circuitry, further comprises
determining the sentiment, the gender and the age group of the subject by applying the single feature vector to each of the plurality of support vector machines; and
selecting a result from among the support vector machines for each of the four age groups.

13. The method of claim 11, further comprising training the machine learning model including
extracting, by the circuitry, a plurality of visual feature vectors from a plurality of videos of different subjects to classify each subject according to positive or negative sentiment;
extracting, by the circuitry, a plurality of acoustic feature vectors from audio signals associated with the videos; and
extracting, by the circuitry, a plurality of textual feature vectors from text derived from the audio signals.

14. The method of claim 13, further comprising
extracting, by the circuitry, visual features from a portion of each of the plurality of videos to obtain the plurality of visual feature vectors, acoustic features from a portion of an audio signal associated with the videos to obtain the plurality of acoustic feature vectors, and textual features from text for each utterance in the audio signal to obtain the plurality of textual feature vectors; and
combining, by the circuitry, the visual feature vector, the acoustic feature vector, and the textual feature vector for each of the plurality of videos into a plurality of respective single feature vectors.

15. The method of claim 11, wherein the extracting the visual features includes determining, by the circuitry, an angle and a magnitude of each pixel for two consecutive frames of the video.

16. The method of claim 11, wherein the extracting the audio features includes extracting, by the circuitry, of prosodic features and spectral features of the audio signal.

17. The method of claim 11, wherein the extracting the textual features includes normalizing, by the circuitry, Arabic characters that have different forms.

18. The method of claim 13, wherein the training of the machine learning model includes labeling the age group as one of multiple age group classes including young adults, young-middle-aged, middle-aged, and senior.

* * * * *